United States Patent
Humfeld et al.

(10) Patent No.: US 10,953,575 B2
(45) Date of Patent: Mar. 23, 2021

(54) ENHANCED SYSTEMS THAT FACILITATE VACUUM BAG CURING OF COMPOSITE PARTS

(71) Applicant: The Boeing Company, Chicago, IL (US)

(72) Inventors: Keith Daniel Humfeld, Federal Way, WA (US); Arthur August Rugtvedt, Covington, WA (US); Jeffrey Lynn Duce, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 607 days.

(21) Appl. No.: 15/043,216

(22) Filed: Feb. 12, 2016

(65) Prior Publication Data

US 2017/0232643 A1    Aug. 17, 2017

(51) Int. Cl.
| | |
|---|---|
| B29C 43/36 | (2006.01) |
| B29C 70/44 | (2006.01) |
| B29C 33/58 | (2006.01) |
| B29C 33/38 | (2006.01) |
| B29C 33/42 | (2006.01) |
| B29C 70/30 | (2006.01) |
| B29C 51/28 | (2006.01) |

(52) U.S. Cl.
CPC .......... B29C 43/3642 (2013.01); B29C 70/44 (2013.01); *B29C 33/424* (2013.01); *B29C 33/58* (2013.01); *B29C 51/28* (2013.01); *B29C 70/30* (2013.01); *B29C 2033/3864* (2013.01); *B29C 2043/3647* (2013.01)

(58) Field of Classification Search
None
See application file for complete search history.

(56) References Cited

U.S. PATENT DOCUMENTS

| | | | |
|---|---|---|---|
| 5,031,483 A | 7/1991 | Weaver | |
| 5,078,592 A | 1/1992 | Grimshaw et al. | |
| 5,145,621 A * | 9/1992 | Pratt | B29C 33/30 156/245 |
| 5,158,132 A | 10/1992 | Guillemot | |
| 5,198,968 A | 3/1993 | Galvagni | |
| 5,316,462 A * | 5/1994 | Seemann | B29C 33/10 425/112 |
| 6,012,883 A | 1/2000 | Engwall et al. | |
| 6,375,880 B1 | 4/2002 | Cooper et al. | |
| 8,313,600 B2 * | 11/2012 | Wilson | G06F 3/0418 156/169 |
| 8,672,665 B2 * | 3/2014 | Rydin | B29C 43/12 156/285 |

(Continued)

OTHER PUBLICATIONS

ACTRInfor: VacuSpray Demonstration. Mar. 25, 2010; (retrieved Oct. 22, 2019) https://www.youtube.com/watch?v=SYIVpw_b-KU (Year: 2010).*

(Continued)

*Primary Examiner* — Joseph S Del Sole
*Assistant Examiner* — Manley L Cummins, IV
(74) *Attorney, Agent, or Firm* — Duft & Bornsen, PC

(57) ABSTRACT

Systems and methods are provided for enhancement of vacuum bagging processes for a composite part. One system includes dispensers configured to dispense materials onto a forming tool for a composite part, and a controller. The controller is able to identify a location for placing the composite part on the tool, and to direct the dispensers to lay up a laminate of constituent material for the composite part at the location. The controller is also able to direct the dispensers to spray vacuum bag material atop the laminate to form a vacuum bag that covers the laminate.

20 Claims, 18 Drawing Sheets

(56) References Cited

U.S. PATENT DOCUMENTS

| | | | | |
|---|---|---|---|---|
| 2004/0046291 A1* | 3/2004 | Johnson | ............... | B29C 70/342 |
| | | | | 264/510 |
| 2006/0266472 A1* | 11/2006 | Kipp | ............... | B29C 70/44 |
| | | | | 156/286 |
| 2008/0008836 A1* | 1/2008 | Kipp | ............... | B29C 33/56 |
| | | | | 427/307 |
| 2008/0182054 A1* | 7/2008 | Ridges | ............... | B29C 70/30 |
| | | | | 428/35.2 |
| 2008/0211130 A1* | 9/2008 | Rydin | ............... | B29C 41/08 |
| | | | | 264/102 |
| 2010/0065717 A1* | 3/2010 | Wilson | ............... | B29C 33/42 |
| | | | | 249/13 |
| 2011/0146906 A1 | 6/2011 | Anderson et al. | | |
| 2012/0315445 A1 | 12/2012 | Yamasaki et al. | | |
| 2013/0044175 A1 | 2/2013 | Duce et al. | | |
| 2014/0232552 A1 | 8/2014 | Kessler et al. | | |
| 2017/0106585 A1 | 4/2017 | Nino et al. | | |

OTHER PUBLICATIONS

Beutler. VacuSpray: Spray-on Vacuum Bag Technology for the production of composite parts. Feb 14, 2007; (retrieved Oct. 22, 2019) https://www.youtube.com/watch?v=V9aX0WcDh7g (Year: 2007).*

Smooth-on: Vacuum Bagging with EZ-Spray Silicone Reusable Composite Bags 1/3; Oct. 14, 2009. (Retrieved online Oct. 23, 2019). https://www.youtube.com/watch?v=vf-Z-xEgPSM (Year: 2009).*

Black, Sara. Composites World: Reusable vacuum membranes: Coming of age?. Nov. 30, 2013. (retrieved Oct. 22, 2019) https://www.compositesworld.com/articles/reusable-vacuum-membranes-coming-of-age (Year: 2013).*

Black, Sara. Composites World: RVB insider insights. Nov. 30, 2013. (retrieved Oct. 22, 2019) http://www.compositesworld.com/articles/rvb-insider-insights (Year: 2013).*

Compare Open-Cell & Closed-Cell Spray Foam Insulations, Icynene, http://www.icynene.com/en-us/architects/spray-foam-basics/compare-ope-cell-closed-cell-spray-foam-insulations, Jan. 25, 2016.

Creating a Vacuum Bag Using EZ~Spray® Silicone20, http://www.smooth-on.com/gallery.php?galleryid=441, Jan. 4, 2016.

High Efficiency Foam Insulation, http://www.energsmart.com/spray-foam-insulation/open-vs-closed-cell-foam.html, Jan. 25, 2016.

Sworl, Vacuum Infusion Bagging System, http://www.sworl.net/, Jan. 4, 2016.

U.S. Appl. No. 14/922,902.

* cited by examiner

ENHANCED SYSTEMS THAT FACILITATE VACUUM BAG CURING OF COMPOSITE PARTS

FIELD

The disclosure relates to the field of composite parts, and in particular, to curable composite parts.

BACKGROUND

Many composite parts (e.g., carbon fiber products, such as aircraft wings) are created via vacuum bag curing processes. Using these techniques, a laminate of plies of constituent material is laid-up onto a forming tool that will mold the constituent material into a desired shape. In order to ensure that the laminate consolidates into the desired shape, a vacuum bag is constructed around the laminate and sealed to the forming tool. As air is drawn from the vacuum bag, the bag applies pressure to contour and consolidate the laminate against the forming tool. The vacuum bag also removes volatile compounds present within the laminate. Heat may also be applied to the composite part as part of a process to cure the laminate into a solid. The process of laying-up and curing laminates may be repeated over time to fabricate co-bonded structures.

As a part of preparing the tool for laying-up a composite part, volatile chemicals may be used to form the release agents that enable the composite part to be removed from the tool after it is cured. This in turn creates a need for expensive ventilation and safety equipment. Furthermore, undesirable application of vacuum bagging materials to composite parts may result in the formation of air bubbles and other inconsistencies within a composite part being fabricated. Inconsistencies in a composite part cause it to exhibit tolerancing issues. For mission-critical composite parts (e.g., the wings of an aircraft), such inconsistencies may be unacceptable, meaning that parts with out of tolerance inconsistencies may need to be scrapped or reworked. Hence, the industry continues to seek out enhanced techniques for fabricating composite parts in a manner that decreases cost and/or increases quality.

SUMMARY

Embodiments described herein provide for systems that utilize computer-aided techniques to dispense consumable materials for vacuum bagging a composite part. Further embodiments provide for enhanced forming tools capable of measuring and/or altering the temperature of a composite part during curing, as well as enhanced methods for utilizing and/or manufacturing such forming tools.

One embodiment is a system for automated dispensing and assembly of vacuum bagging materials for a composite part. The system includes dispensers configured to dispense materials onto a forming tool for a composite part, and a controller. The controller is able to identify a location for placing the composite part on the tool, to direct the dispensers to lay up a laminate of constituent material for the composite part at the location, and to spray vacuum bag material atop the laminate proximate to the location to cover the laminate.

A further embodiment is a method for automated dispensing and assembly of vacuum bagging materials for a composite part. The method includes identifying a location for placing a composite part on a forming tool. The method also includes directing a dispenser to lay up a laminate of constituent material for the composite part at the location, and directing a dispenser to dispense vacuum bag material atop the laminate proximate to the location to cover the laminate.

A further embodiment comprises a non-transitory computer readable medium embodying programmed instructions which, when executed by a processor, are operable for performing a method for automated dispensing and assembly of vacuum bagging materials for a composite part. The method includes identifying a location for placing a composite part on a forming tool, and directing a dispenser to lay up a laminate of constituent material for the composite part at the location. The method also includes directing a dispenser to spray vacuum bag material atop the laminate proximate to the location to cover the laminate.

A further embodiment is a system for automated dispensing and assembly of vacuum bagging materials for a composite part. The system includes a controller, a first dispenser configured to dispense constituent material for a composite part atop a forming tool, and a second dispenser configured to dispense a consumable material that facilitates vacuum bagging processes at the composite part, in response to instructions from the controller that are based on a geometry of the composite part.

A further embodiment is an enhanced forming apparatus for a composite part. The apparatus includes a forming tool configured to hold a composite part in a defined shape while the composite part is curing in a vacuum bag sealed to the tool, a thermocouple integrated within the tool configured to sense temperature at a surface of the tool, and traces integrated within the tool that carry temperature signals generated by the thermocouple while the composite part is curing.

A further embodiment is a method for operating an enhanced forming apparatus. The method includes initiating curing of a composite part in a vacuum bag sealed to a forming tool holding the composite part in a defined shape, detecting a temperature of the composite part during curing via a thermocouple integrated into the tool, and adjusting heat applied to the composite part in response to the detected temperature.

A further embodiment is a further enhanced forming apparatus for a composite part. The apparatus includes a forming tool configured to hold a composite part in a defined shape while the composite part is curing in a vacuum bag sealed to the tool, a heating element integrated within the tool configured to generate heat that conducts to a surface of the tool, and traces integrated within the tool that provide power to the heating element while the heating element is generating heat.

A still further embodiment is a method for operating an enhanced forming apparatus. The method includes initiating curing of a composite part in a vacuum bag sealed to a forming tool holding the composite part in a defined shape, detecting a temperature of the composite part during curing, and adjusting an amount of heat applied to the composite part in response to the detected temperature by energizing a heating element integral with the forming tool.

A still further embodiment is a system for printing an enhanced forming apparatus. The system includes a controller able to identify a three dimensional (3D) shape for a forming tool that holds a composite part while the composite part is curing, and a 3D printer able to print base material in response to commands from the controller to create a portion of the tool based on the 3D shape. The controller is configured to identify a location of an electrical component within the forming tool, to print a groove in the forming tool at the location, to direct a dispenser to place the electrical component into the groove before the tool has finished printing, and to print base material on top of the electrical component to cover the groove and seal the electrical component into the tool.

A still further embodiment is a method for operating a system for printing an enhanced forming apparatus. The method includes identifying a three dimensional (3D) shape of a forming tool that is configured to hold a composite part in a defined shape while the composite part is curing in a vacuum bag. The method also includes printing base material based on input in order to create a portion of the forming tool based on the 3D shape, identifying a location of a thermocouple within the tool, and printing a groove into the forming tool at the location. The method also includes directing a dispenser to place the thermocouple into the groove before the tool has finished printing, and printing base material on top of the thermocouple to cover the groove and seal the thermocouple into the tool.

A still further embodiment is a method for recycling a forming apparatus. The method includes imaging a forming tool, determining a new 3D shape for the forming tool, generating instructions for printing metal onto the forming tool to alter the forming tool into the 3D shape, and directing the 3D printer to print metal onto the forming tool based on the instructions.

Yet another embodiment is a method for operating a system for printing an enhanced forming apparatus. The method includes identifying a three dimensional (3D) shape of a forming tool that is configured to hold a composite part in a defined shape while the composite part is curing in a vacuum bag. The method also includes printing base material based on input in order to create a portion of the forming tool based on the 3D shape, identifying a location of a heating element within the tool, and printing a groove into the forming tool at the location. The method also includes directing a dispenser to place the heating element into the groove before the tool has finished printing, and printing base material on top of the heating element to cover the groove and seal the heating element into the tool.

Yet another embodiment is an apparatus with enhanced cart electronics for a composite part. The apparatus includes a cart body, and multiple legs attached to the cart body, each leg comprising a foot adapted for insertion into a corresponding foot pad of an autoclave. The apparatus also includes an electrical connector that is proximate to one of the feet and is configured to electrically couple with an outlet of the autoclave when the feet are inserted into the autoclave, providing power to the cart.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 27:
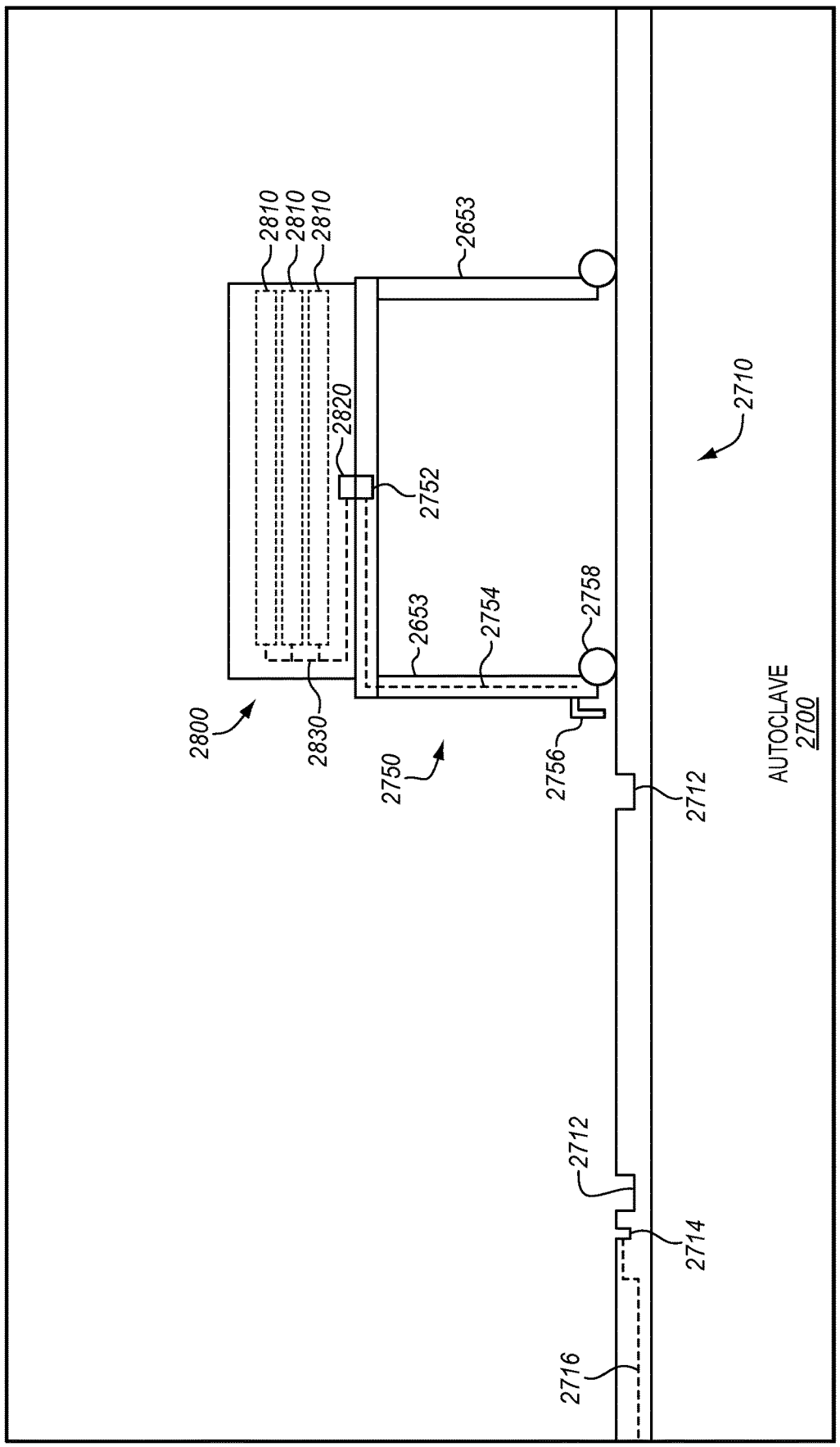
FIG. 27 is a diagram illustrating an enhanced cart with an electrical connector adapted to mate with a power system of an autoclave in an exemplary embodiment.
Figure 28:
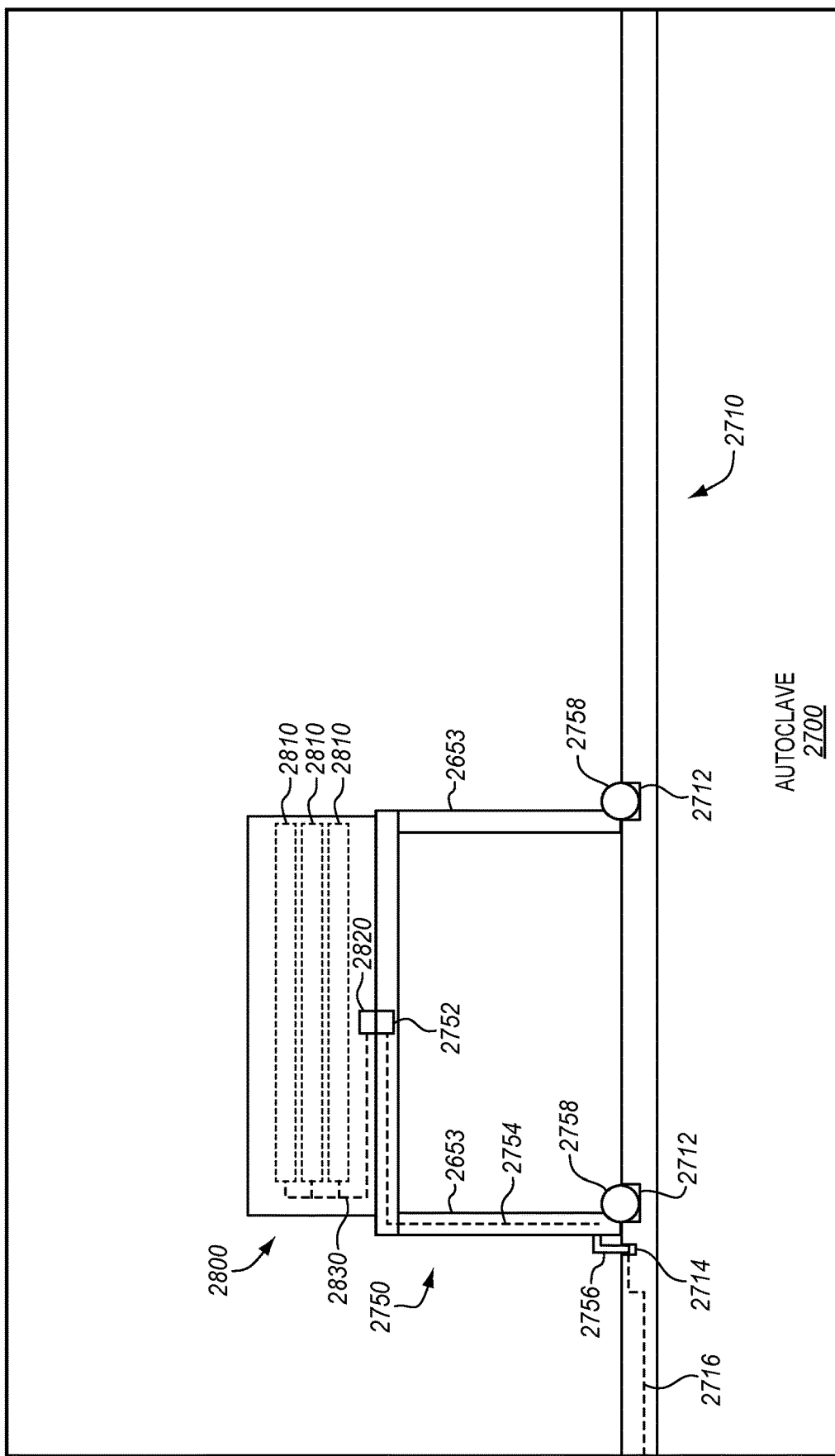
FIG. 28 is a diagram illustrating an enhanced cart with an electrical connector that is mated with a power system of an autoclave in an exemplary embodiment.
Figure 29:
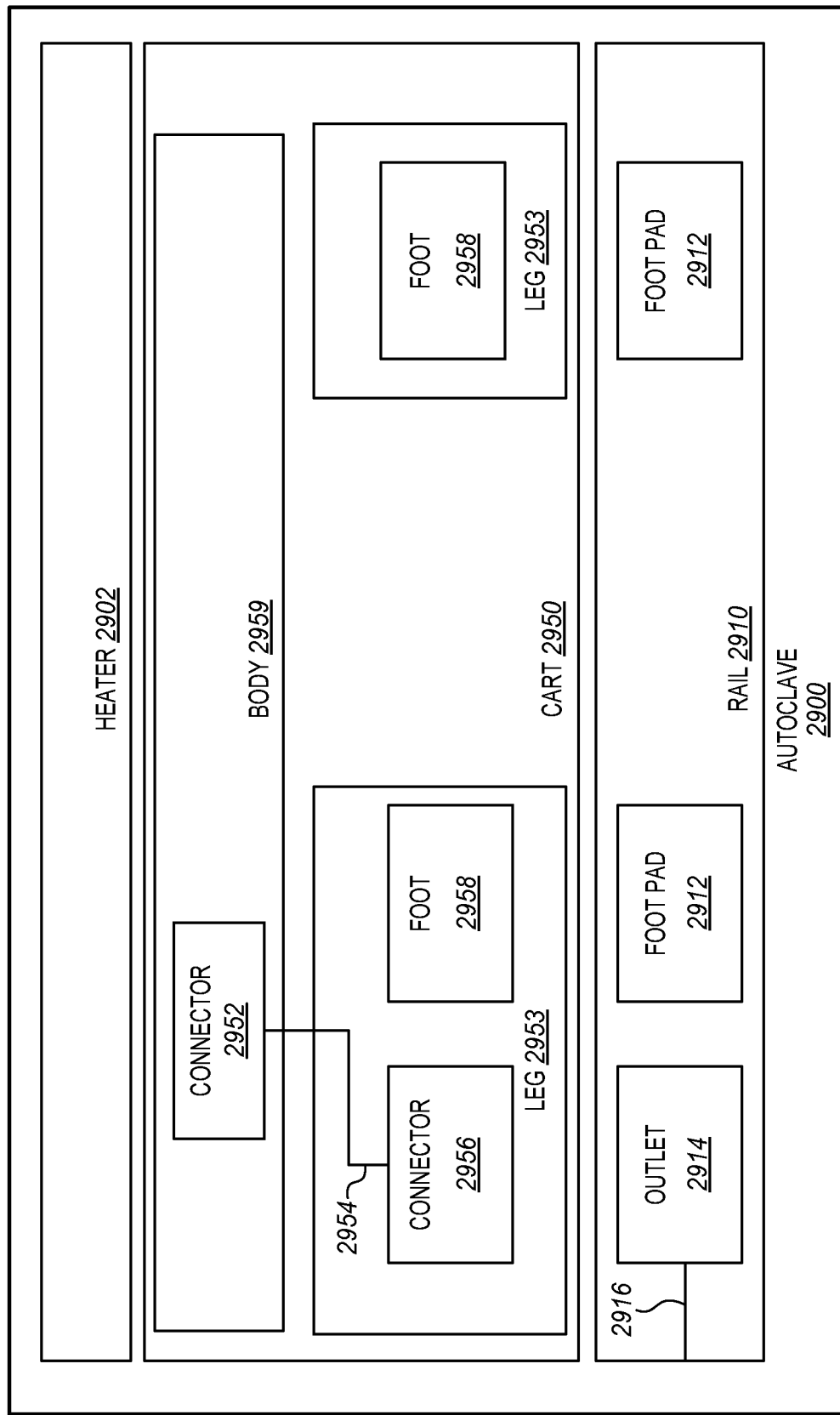
FIG. 29 is a block diagram illustrating an enhanced cart in an exemplary embodiment.

The following systems and techniques may be implemented in a fabrication environment where multiple individual composite parts are made over time in accordance with vacuum bagging techniques. In this fabrication environment, forming tools themselves may be manufactured and/or modified in order to ensure that they are capable of molding laminates into expected shapes. After the forming tools have been manufactured, laminates are laid-up onto the forming tools, bagged, and cured (e.g., by placing the forming tools into mobile carts that are moved into an autoclave). FIGS. 1-11 herein discuss enhanced systems and techniques pertaining to automated vacuum bagging processes, while FIGS. 12-26 describe enhanced forming tools that may be used to facilitate the fabrication of composite parts. FIGS. 27-29 describe enhanced carts that may be utilized in conjunction with the enhanced forming tools of FIGS. 12-26.

Automated Placement of Consumables for Vacuum Bagging

Figure 1:
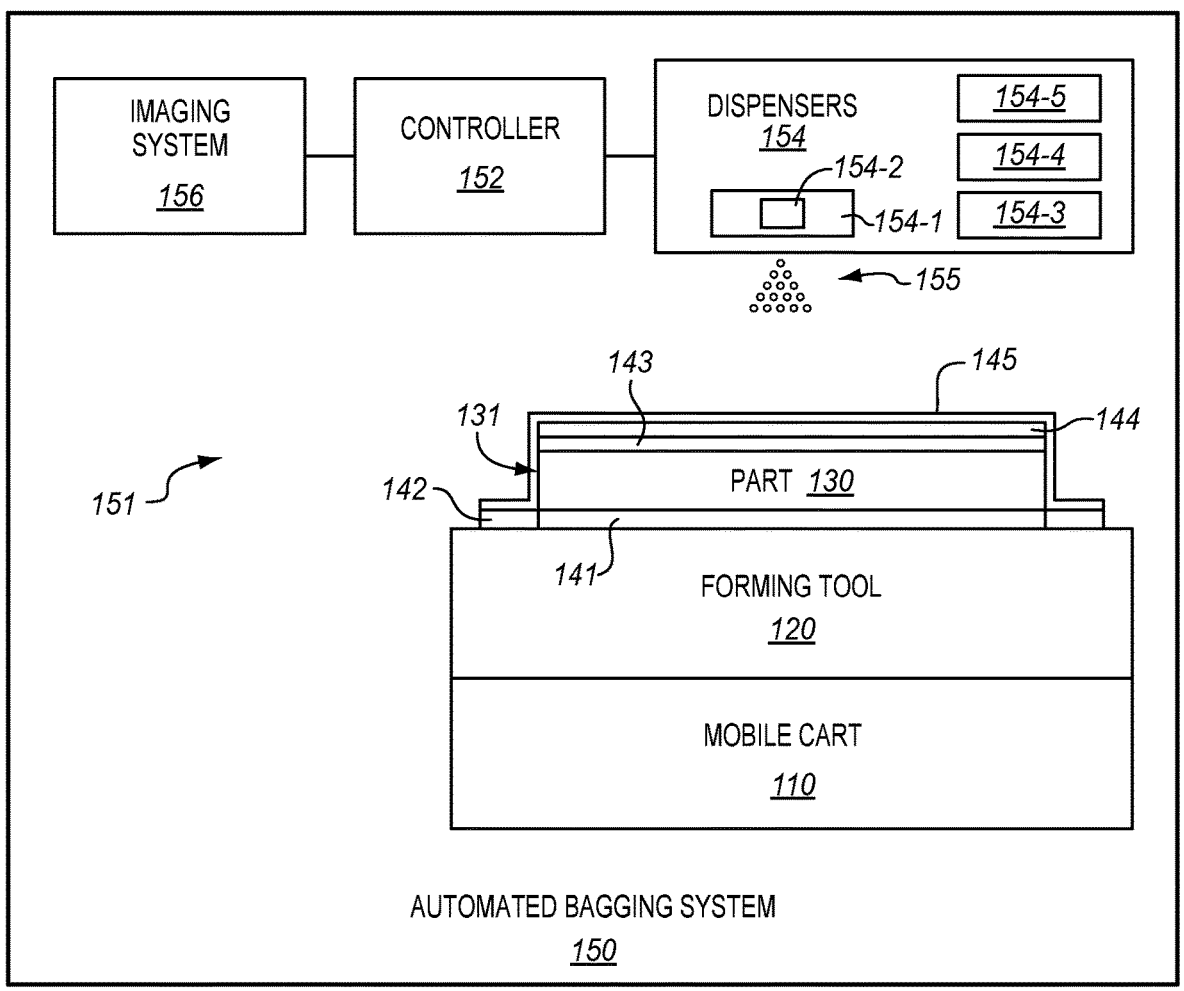
FIG. 1 is a block diagram of an automated bagging system in an exemplary embodiment.

FIG. 1 is a block diagram of an automated bagging system 150 in an exemplary embodiment. System 150 comprises any system or device that is capable of automatically applying one or more consumable materials utilized during the bagging and/or curing process for a composite part 130. For example, system 150 may dispense consumable materials atop and/or beneath composite part 130 to prepare composite part 130 for vacuum bag curing. Composite part 130 (e.g., a laminate of constituent material, comprising one or more plies) rests atop forming tool 120, which itself is placed atop mobile cart 110. In this manner, after part 130 has been properly vacuum bagged, cart 110 may be rolled into an autoclave (not shown in FIG. 1, but illustrated as 2700 of FIG. 27) to initiate the curing of part 130. As shown in FIG. 1, exemplary materials that may be dispensed by system 150 include mold release agent 141, sealant 142, pressure pad/caul 143, breather 144, and vacuum bag 145.

In this embodiment, system 150 comprises dispensers 154, controller 152, and imaging system 156. Imaging system 156 comprises any camera and/or sensors system that is capable of acquiring picture and/or video data in a two dimensional (2D) and/or three dimensional (3D) format for utilization by controller 152. Based on this information, controller 152 directs the operations of dispensers 154 as they dispense consumable materials (e.g., materials that may be used once or a number of times before eventually being disposed of) for vacuum bagging of composite part 130. For example, controller 152 may utilize input from imaging system 156 to detect a border 131 of part 130, and then may direct dispensers 154 to apply consumable materials based upon the border 131 of part 130. Controller 152 may be implemented, for example, as custom circuitry, as a processor executing programmed instructions, or some combination thereof.

Dispensers 154 dispense consumable materials onto composite part 130 based on directions provided by controller 152. Dispensers 154 may include spray heads 154-1 and/or nozzles 154-2 configured to spray consumable materials in liquid form. These liquid materials may then solidify over a period of several seconds or minutes into a solid, at which point in time another consumable material may be added, or cart 110 may be inserted into an autoclave (FIG. 27, 2700) for curing of composite part 130. In one embodiment, at least one of dispensers 154 comprises a spray nozzle 154-2 mounted on a five-axis gimbal (not shown) capable of moving in three dimensions (e.g., X, Y, Z) based on input from controller 152. Each of dispensers 154 may comprise a different type of dispenser, and/or may dispense a different consumable material for use in vacuum bag curing.

Dispensers 154 may also include one or more Automated Fiber Placement (AFP) machines 154-3, or similar devices, utilized to lay-up a layer of constituent material for composite part 130, and/or to lay-up other consumable materials that may be dispensed as plies. This may include, for example, vacuum bagging material, sealant tape, peel plies, breathers, pressure pads, etc. Dispensers 154 may further include extruders 154-4 that are configured to extrude consumable materials in liquid/gel form for use in vacuum bagging (e.g., as described with regard to FIG. 2). For example, an extruder may be used to extrude gel sealant in lieu of sealant tape for a composite part. In a further embodiment, at least one of dispensers 154 comprises a robotic arm 154-5 configured to retrieve and position sheets of consumable material onto part 130.

System 150 may be sealed from the external environment, and may utilize different environmental parameters than its surroundings. For example, an interior 151 of system 150 may be operated at a different temperature and/or pressure than the ambient environment, and the air inside of system 150 (if any) may exhibit a different combination of gases than the surroundings. For example, gas within interior 151 may exhibit more oxygen (e.g., parts per million (PPM)) than the exterior in order to cause dispensed materials to react and solidify more quickly. Or, gas within interior 151 may exhibit less oxygen (PPM) than the surroundings in order to cause dispensed materials to solidify less quickly.

Illustrative details of the operation of system 150 will be discussed with regard to FIG. 2. Assume, for this embodiment, that cart 110 and tool 120 have been placed into system 150, but that no composite part has yet been placed upon tool 120. Further, assume that controller 152 has loaded data into an internal memory indicating a geometry to be laid-up for part 130.

Figure 2:
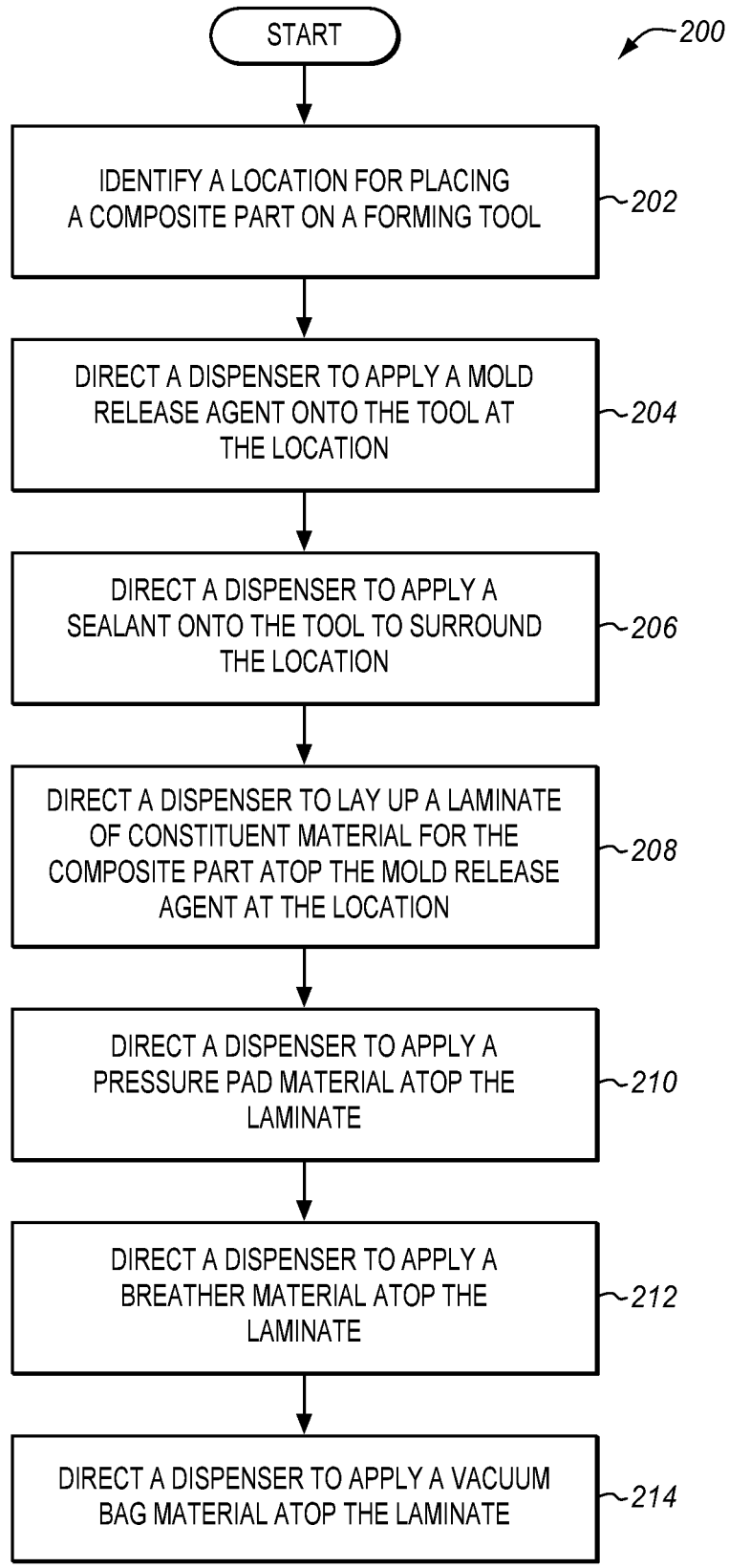
FIG. 2 is a flowchart illustrating a method for operating an automated bagging system in an exemplary embodiment.

FIG. 2 is a flowchart illustrating a method 200 for operating an automated bagging system in an exemplary embodiment. The steps of method 200 are described with reference to system 150 of FIG. 1, but those skilled in the art will appreciate that method 200 may be performed in other systems. The steps of the flowcharts described herein are not all inclusive and may include other steps not shown. The steps described herein may also be performed in an alternative order. The steps described in FIG. 2 are illustrated by FIGS. 3-10, which are diagrams illustrating application of consumable curing materials for a composite part in an exemplary embodiment.

Figure 3:
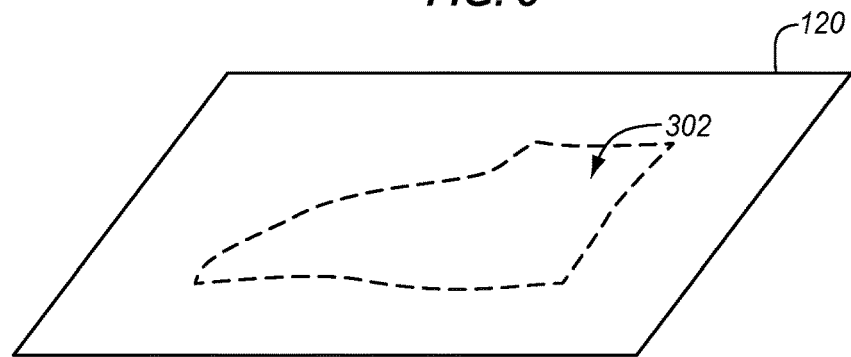
FIGS. 3-10 are diagrams illustrating application of consumable curing materials for a composite part in an exemplary embodiment.
Figure 4:
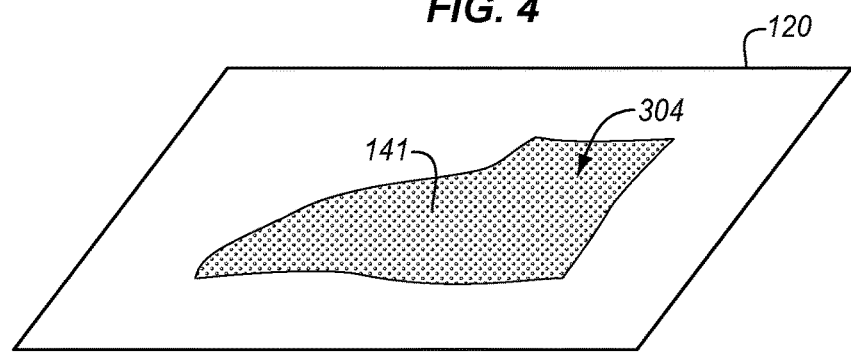

In step 202, controller 152 identifies a location for placing part 130 onto tool 120. For example, controller 152 may operate imaging system 156 to identify the orientation and position of tool 120, and may then correlate this data with information that indicates a position that part 130 will occupy when it is placed or laid-up upon tool 120. FIG. 3 illustrates location 302 for part 130 on tool 120.

After location 302 is known, controller 152 takes steps to ensure that part 130 will properly release from tool 120 after curing is completed. To this end, controller 152 directs one of dispensers 154 to apply a mold release agent 141 onto tool 120 at location 302 (step 204). For example, controller 152 may direct a dispenser to dispense the mold release agent 141 directly onto location 302, and also within a certain threshold of distance of location 302 (e.g., location 302, plus a one centimeter border zone). Location 304 of FIG. 4 indicates where mold release agent 141 is dispensed atop tool 120 in an exemplary embodiment.

The mold release agent 141 may be applied as an aerosol spray, as an extruded liquid, as a ply of material or via any suitable technique. In one embodiment, the mold release agent 141 is applied by a dispenser as an aerosol spray to evenly coat tool 120 in a thin layer. The mold release agent 141 may comprise any suitable agent that facilitates the separation of part 130 from tool 120 after completion of curing (e.g., a Frekote 700-NC product).

In directing one or more dispensers 154, controller 152 may provide instructions for repositioning the dispenser to a new location, changing the angle and/or tilt of the dispenser, activating the dispenser, and/or deactivating the dispenser in order to ensure that consumable materials are dispensed at appropriate locations. This may include providing instructions to adjust a 2D position of the dispenser within system 150, and may further include instructions for altering a height of the dispenser while operating the dispenser. These techniques may be utilized, for example, to ensure that a spray head of the dispenser remains a constant height above location 304, even when the contours of forming tool 120 rise or fall. Further instructions from controller 152 may indicate a pressure at which to spray mold release agent 141. By varying these parameters, controller 152 may apply a coat of suitable thickness at each desired location without spraying outside of the intended area. Furthermore, since the locations at which to apply consumable materials may be determined by controller 152 based on the geometry of the composite part, these consumable materials may be used more efficiently than in systems that apply the materials by hand.

Figure 5:
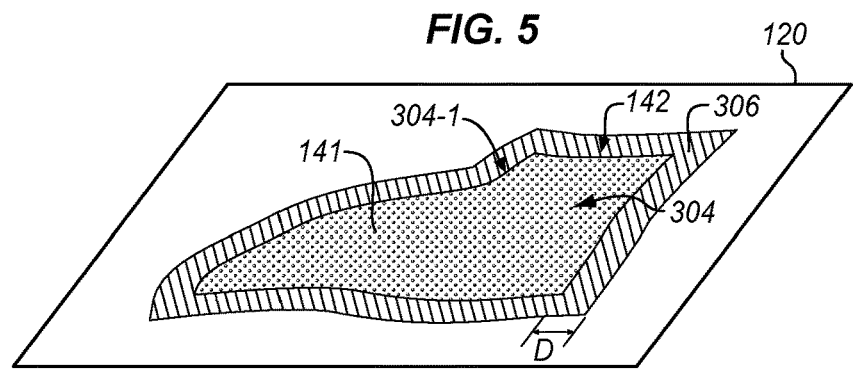

In step 206, controller 152 directs one of dispensers 154 to apply sealant 142 onto tool 120 proximate to the location 304 (e.g., along a border or periphery of location 304). For example, FIG. 5 illustrates that sealant 142 is dispensed at location 306, which surrounds a periphery/border of location 304 but does not intersect location 304. Sealant 142 enables a vacuum bag to be sealed onto tool 120, thereby providing an evacuated environment for a composite part to be cured. Controller 152 may apply sealant 142 in accordance with a predefined plan, or controller 152 may automatically calculate the where to apply sealant 142. For example, controller 152 may apply sealant 142 along a proximate to border 304-1 that surrounds location 304 or that surrounds where the composite part will be placed, at some setoff distance (e.g., D) away from any mold release agent 141, etc.

In some embodiments, sealant 142 may be compromised if it is sprayed directly onto mold release agent 141. Thus, controller 152 may direct a dispenser to apply a mask (not shown) to tool 120 before applying mold release agent 141, and then may remove the mask (not shown) before applying the sealant 142. This ensures that no mold release agent 141 reaches areas on tool 120 where sealant 142 will be placed. Controller 152 may alternatively chemically clean mold release agent 141 from location 306 where sealant 142 will be applied, or may carefully direct the application of mold release agent 141 to ensure that it is not dispensed onto location 306 (e.g., at a concentration that would interfere with sealant 142).

If the first layer of composite part 130 has not yet been laid, then processing may proceed to step 208 below. Alternatively, if multiple layers of composite part 130 have already been laid-up and cured, then controller 152 may direct one of dispensers 154 (e.g., a robot arm) to place composite part 130 onto tool 120 atop mold release agent 141. Once placed, part 130 will be positioned to enable lay-up of another layer/ply of constituent material (e.g., carbon fiber).

Figure 6:
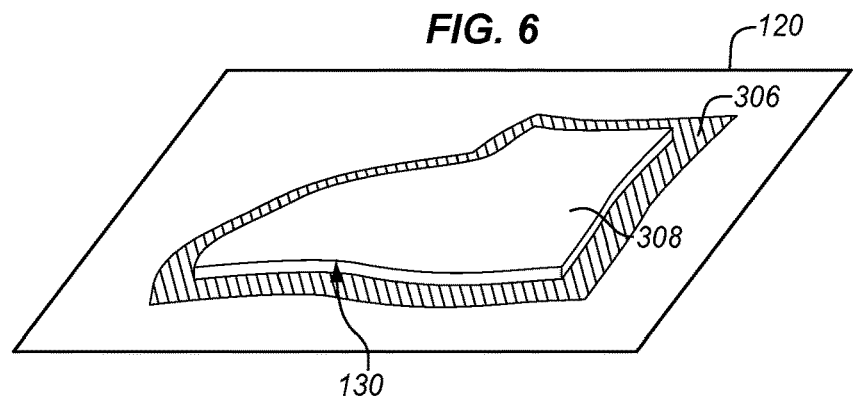

In step 208, controller 152 directs one of dispensers 154 (e.g., an AFP machine) to lay up one or more plies of constituent material into a laminate 308 for composite part 130 at location 304 (i.e., atop mold release agent 141). In embodiments where composite part 130 has already been placed onto tool 120, laminate 308 is laid directly onto composite part 130, which is itself directly atop mold release agent 141. In further embodiments, laminate 308 is laid directly onto portions of tool 120 that include mold release agent 141. This step is shown in FIG. 6. Laminate 308 will cure into composite part 130 after it has been vacuum bagged and heated in an autoclave. However, in its current form, laminate 308 is not yet cured. In some embodiments, controller 152 further directs a technician or one of dispensers 154 apply a peel ply onto laminate 308. A peel ply is an interlayer that is used to ensure that vacuum bagging materials will not bond to laminate 308 while laminate 308 is curing.

Figure 7:
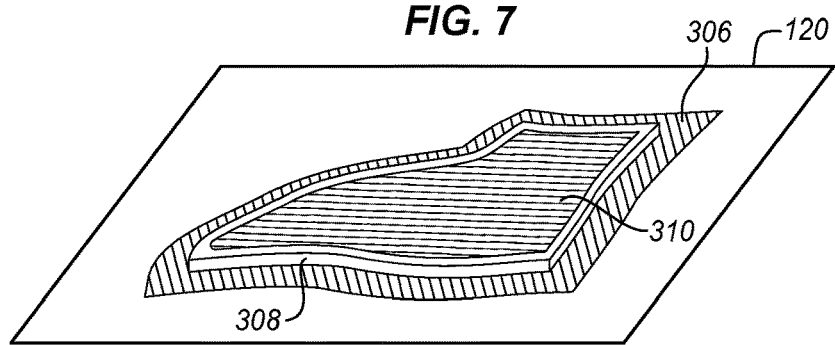

Depending on the part being made, a pressure pad may be desired to facilitate curing. Thus, in one embodiment, in step 210 controller 152 directs one of dispensers 154 to apply a pressure pad material 310 (also known as a "caul plate") atop laminate 308 (e.g., directly atop laminate 308, or atop a peel ply that itself directly contacts laminate 308). This is shown in FIG. 7 where pressure pad material 310 is dispensed atop laminate 308. Dispensing pressure pad material 310 may comprise directing a robot arm to acquire a pre-made pressure pad (e.g., from a supply of pressure pads) and place the pressure pad atop laminate 308. In a further embodiment, pressure pad material 310 is sprayed atop laminate 308 (e.g., via a spray nozzle dispenser), or 3D printed as liquid polymer. Controller 152 waits for a period of time to ensure that pressure pad material 310 cures/solidifies before proceeding to step 212. Pressure pad material 310 may comprise a room-temperature curing thermosetting mat material (e.g., a 5-minute epoxy) that is one eighth of an inch thick. In a further embodiment, a peel ply is added to laminate 308, to a breather material 312 (FIG. 8), to a vacuum bag material 318 (FIG. 10), and to pressure pad material 310.

Figure 8:
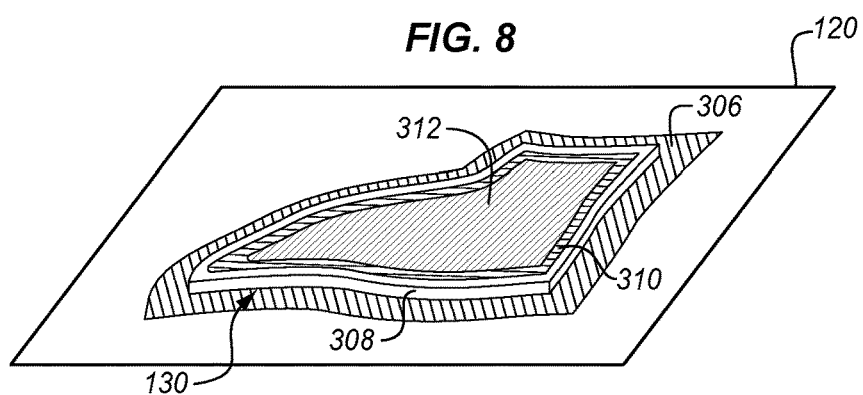

In step 212, controller 152 directs one of dispensers 154 to dispense a breather material 312 (e.g., a polyester mat) atop laminate 308 (and, for example, also over pressure pad material 310). This is shown in FIG. 8 where breather material 312 is dispensed atop pressure pad material 310. Breather material 312 comprises an open cell material capable of allowing air to travel freely through it. Breather material 312 may be dispensed from a supply of breathers by a robot arm, or may be sprayed and allowed to solidify over time. That is, controller 152 may wait for breather material 312 to harden before proceeding with a next step.

In further embodiments, a parting film and/or peel ply may be applied between any of the various materials discussed herein. The parting film may be sprayed as an ethylene tetrafluoroethylene (ETFE) or polytetrafluoroethylene (PTFE) spray that polymerizes into a hardened solid may be applied between the various layers by one of dispensers 154. In this manner, the parting film will prevent neighboring layers from interfering with each other.

Figure 9:
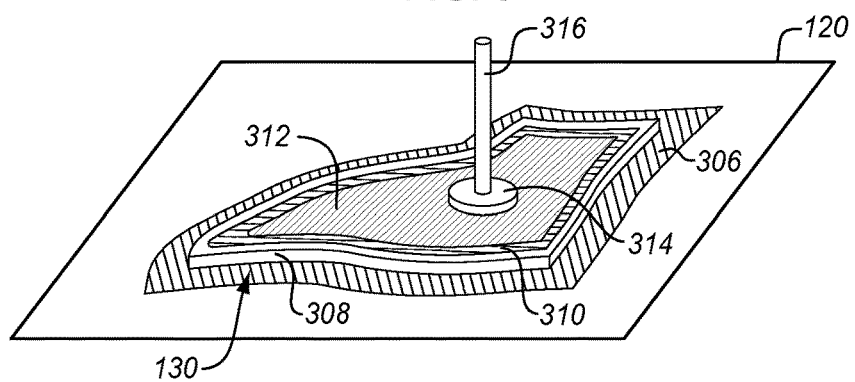
Figure 10:
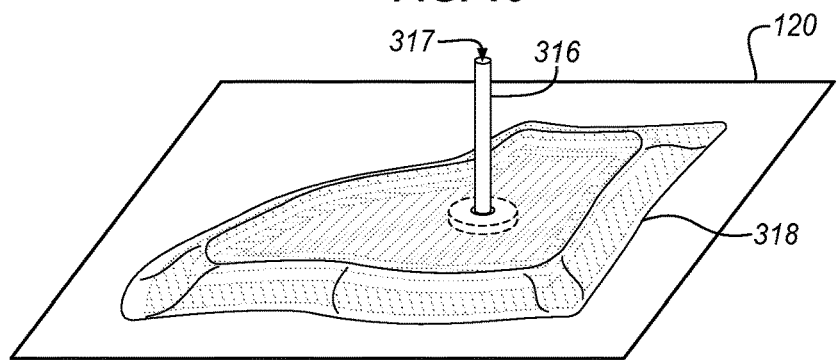

With these materials in place, controller 152 may direct a robot arm or technician to place a port 314 atop breather material 312 as shown in FIG. 9. Hollow shaft 316 is located above port 314, and may provide an air pathway 317 for air to travel through port 314. With port 314 and shaft 316 in place, in step 214, controller 152 directs one of dispensers 154 to spray vacuum bagging material 318, proximate to the location of laminate 308 such that vacuum bag material 318 covers laminate 308 as well as sealant 142. This process may involve controller 152 identifying the location 306 of sealant 142 as it surrounds the composite part, and then spraying vacuum bagging material 318 on top of the composite part and sealant 142. In this embodiment, vacuum bagging material 318 is sprayed atop laminate 308, but the vacuum bagging material 318 is not directly on top of laminate 308. For example, vacuum bagging material 318 may be sprayed directly atop breather material 312. Controller 152 may further identify port 314, and direct dispensers 154 to surround the port with vacuum bagging material 318, without clogging air pathway 317 of hollow shaft 316.

Vacuum bagging material 318 may be applied in a liquid form and sprayed. In embodiments where vacuum bagging material 318 is sprayed, a dispenser 154 for vacuum bagging material 318 may be positioned beside shaft 316, so that dispenser 154 is located beneath the top of shaft 316, but above port 314 while spraying. This ensures that sprayed vacuum bagging material 318 will not clog shaft 316 or otherwise interfere with the passage of air out of port 314 and through shaft 316.

In embodiments where vacuum bagging material 318 is applied as a liquid, it may penetrate and/or block a portion of breather material 312. Thus, it may be desirable to dispense more breather material 312 than would typically be used in step 212, in order to account for issues of cell penetration and blockage in breather material 312. In these embodiments where vacuum bagging material 318 is liquid, it may comprise polyethylene latex, neoprene, etc. Infrared heat may also be applied to vacuum bagging material 318 after it is dispensed, in order to ensure vacuum bagging material 318 solidifies rapidly. Using a liquid form for vacuum bagging material 318 also provides a benefit in that it prevents issues with bag bridging and breaching. Since the vacuum bag material 318 solidifies onto the composite part, it does not bridge substantial gaps when a vacuum is drawn.

Figure 11:
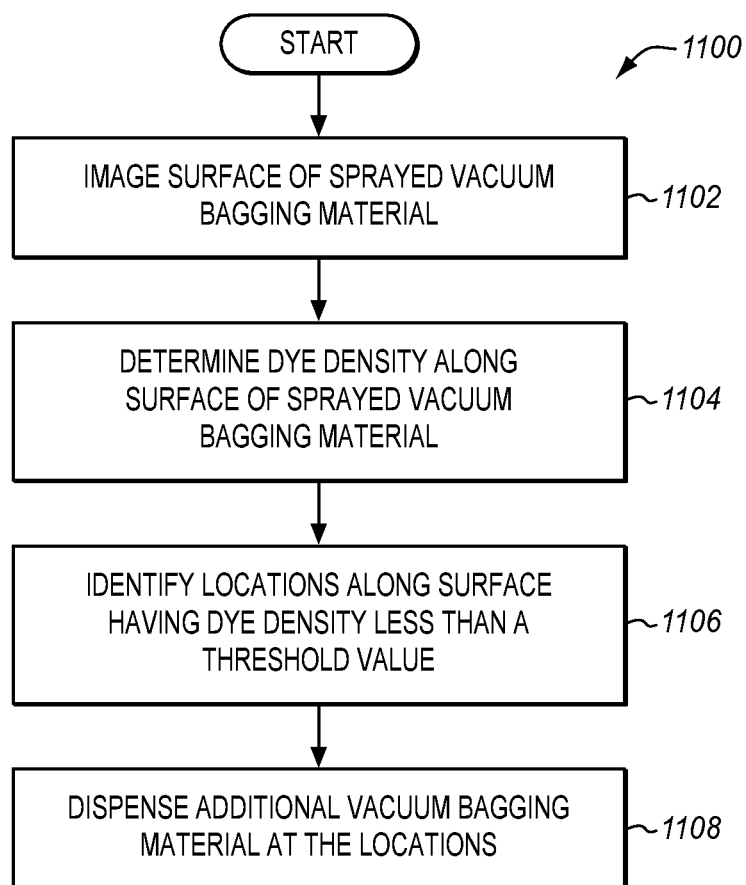
FIG. 11 is a flowchart illustrating a method for selectively adding more vacuum bagging material in an exemplary embodiment.

In a further embodiment, vacuum bagging material 318 is applied as a liquid spray and is impregnated with a colored dye (e.g., a fluorescent dye, infrared dye, visible light dye, etc.). FIG. 11 is a flowchart illustrating a method 1100 for selectively adding more vacuum bagging material 318 based on the presence of colored dye in an exemplary embodiment. Upon completion of step 214, controller 152 operates imaging system 156 to image a surface of material 318 after it has solidified after spraying (step 1102). Controller 152 analyzes data from imaging system 156 to determine a dye density along the surface of material 318 in step 1104. Controller 152 then identifies locations along the surface that have dye density of less than a threshold value in step 1106 (e.g., based on a color of the imaged locations) in an inspection process. Controller 152 then directs one of dispensers 154 to spray additional vacuum bagging material 318 at these locations in step 1108. This technique of selectively reinforcing vacuum bagging material 318 reduces the chance of a vacuum bag rupture when composite part 130 is cured in an autoclave. This step may be performed before, after, or even during the application of a vacuum to the vacuum bagging material 318.

After the vacuum bagging process is complete, a vacuum may be drawn on material 318 to test for leaks. If there are no leaks, composite part 130 may be inserted into an autoclave, may have a vacuum drawn, and may be heated in order to cure ply 308. After composite part 130 has been cured, it is removed from forming tool 120, and the consumable materials used for vacuum bagging are discarded (e.g., peel plies, vacuum bagging material 318, breather material 312, pressure pad 310, sealant 142, and/or mold release agent 141). Controller 152 may then repeat steps 202-214 to lay-up a next layer for composite part 130. In this manner, composite parts may be automatically prepared for curing by system 150 of FIG. 1.

In a further embodiment, sealant 142 comprises a temperature-sensitive adhesive chemical that loses grip at lower temperatures. In this embodiment, after composite part 130 has completed curing, it may be placed into a refrigerated chamber and cooled to a temperature that causes sealant 142 to have reduced levels of grip/tack. This may help to facilitate the removal of vacuum bagging materials from forming tool 120.

The systems and methods described above provide a benefit over prior techniques because they provide an automated system for preparing a composite part for curing via vacuum bag techniques. Such systems are not subject to technician error that may result in leaks or breaks within a vacuum bag. Furthermore, these systems prevent a technician from being exposed to volatile compounds that may off-gas from an uncured composite part (or its associated vacuum bagging materials).

Enhanced Forming Tools for Vacuum Bag Curing

Figure 12:
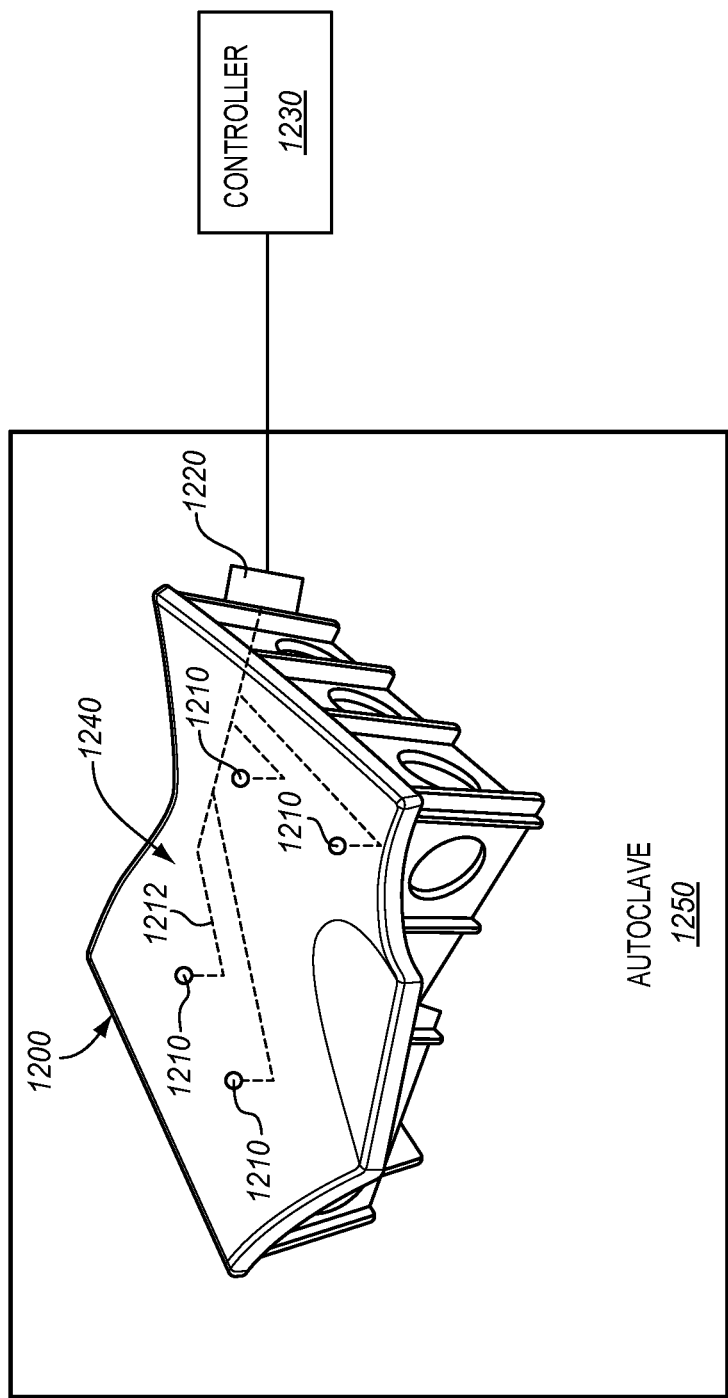
FIG. 12 is a diagram illustrating a forming tool enhanced with integrated thermocouples in an exemplary embodiment.

The following description and figures illustrate enhanced forming tools that may be utilized to facilitate vacuum bagging for composite parts. FIG. 12 is a diagram illustrating a forming tool 1200 enhanced with integrated thermocouples 1210 in an exemplary embodiment. Forming tool 1200 comprises any suitable tool configured to adapt a composite part to the shape of a mold 1240. Forming tool 1200 further comprises thermocouples 1210, which are coupled to junction box 1220 for reporting and/or recording via wires/traces 1212. Thermocouples 1210 are located within forming tool 1200, but are coincident with or protrude through the surface of forming tool 1200 at locations which will be occupied by a composite part during curing. In this manner, thermocouples 1210 may touch the composite part, but do not penetrate the composite part. Thus, thermocouples 1210 may directly measure the temperature of the composite part while it is curing in an autoclave. Additionally, since thermocouples 1210 are integrated within tool 1200, wires/traces 1212 do not need to penetrate a vacuum bag in order to access thermocouples 1210. This reduces the chances of air leaking into the composite part, because it reduces the number of penetrations in the vacuum bag during curing.

In one embodiment, junction box 1220 may comprise a multiplexer at the end of at least one of thermocouples 1210. Printing junction box 1220 such that its electronics are included within tool 1200 (and therefore within an autoclave during curing) may necessitate an amplifier within junction box 1220 in order to increase the signal output from integrated thermocouples 1210 within tool 1200. Since many capacitors used in amplifiers will fail in the heat of an autoclave, it may further be desirable to print any capacitors of the amplifier as solid-state capacitors.

Figure 13:
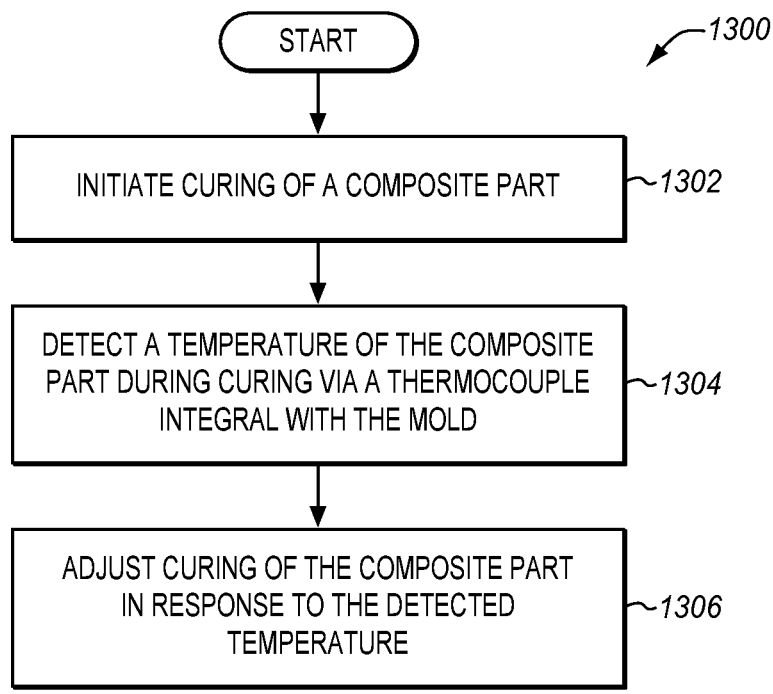
FIG. 13 is a flowchart illustrating a method for utilizing a forming tool enhanced with integrated thermocouples in an exemplary embodiment.

FIG. 13 is a flowchart illustrating a method 1300 for utilizing a forming tool enhanced with integrated thermocouples in an exemplary embodiment. To initiate this method, one of dispensers 154 (e.g., an AFP machine) may apply a ply of constituent material for a composite part onto forming tool 1200. The composite part is vacuum bagged and inserted into autoclave 1250. In step 1302, autoclave 1250 initiates curing of the composite part by heating up to a curing temperature. In step 1304, a controller (e.g., controller 1230, operated by a technician) detects a temperature of the composite part during curing, via thermocouple 1210 that is integral with mold 1240 of forming tool 1200. In step 1306, the controller 1230 adjusts curing of the composite part, in response to the detected temperature. For example, if the temperature is too low, the controller may increase the curing time, and/or increase the temperature within autoclave 1250. Similarly, if the temperature is too high, controller 1230 may decrease the temperature within autoclave 1250, and/or may decrease the curing time.

Figure 14:
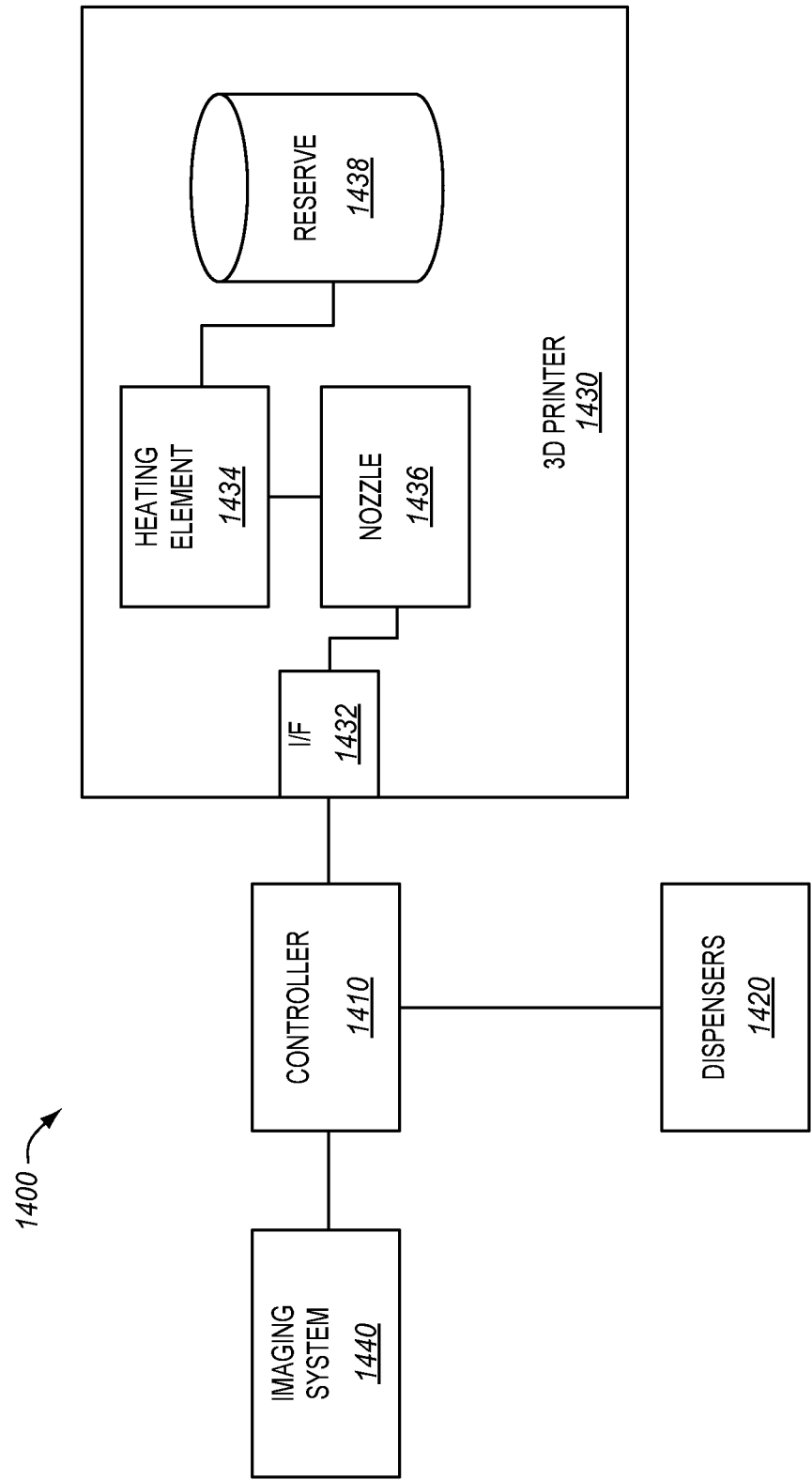
FIG. 14 is a block diagram of a system configured to manufacture enhanced forming tools in an exemplary embodiment.

FIG. 14 is a block diagram of a system configured to manufacture enhanced forming tools in an exemplary embodiment. System 1400 includes controller 1410, which directs the operation of 3D printer 1430, as well as dispensers 1420. 3D printer 1430 comprises any 3D printing system capable of printing 3D shapes via metal additive manufacturing processes. In this embodiment, printer 1430 comprises interface (I/F) 1432, which receives commands from controller 1410 indicating locations at which to apply heat resistant base material (e.g., metal or a very high temperature plastic) that will be used to form tool 1200. 3D printer 1430 draws the material from reserve 1438, heating element 1434 heats the material, and nozzle 1436 deposits the material (e.g., as liquid droplets) in order to generate a desired shape for forming tool 1200. Dispensers 1420 may comprise 3D printers that operate at room temperature, may comprise spray nozzles, etc. Imaging system 1440 may be utilized to guide the operations of 3D printer 1430. For example, imaging system 1440 may detect where electrical components (e.g., conductors, resistors, etc.) should be printed/dispensed within tool 1200, and controller 1410 may direct 3D printer 1430 to print grooves at these locations within tool 1200 in order to leave room for conductive elements to be dispensed. These conductive elements/electrical components may be dispensed by dispensers 1420, or by 3D printer 1430 printing different materials into the grooves (e.g., insulating materials, thermocouple materials, etc. instead of a stiff base material). In one embodiment, 3D printer 1430 includes multiple nozzles, and different nozzles distribute different kinds of materials.

Any suitable technologies for metal printing (e.g., powder bed laser sintering or fused filament fabrication) may be utilized for 3D printing as desired. In a further embodiment, a high temperature plastic may be printed and/or fused deposition molded, so long as the plastic is capable of maintaining sufficient stiffness (e.g., enough stiffness to resist deflection at 90 pounds per square inch (PSI) of load) when heated to approximately two hundred degrees Fahrenheit (F) in autoclave 1250.

Figure 15:
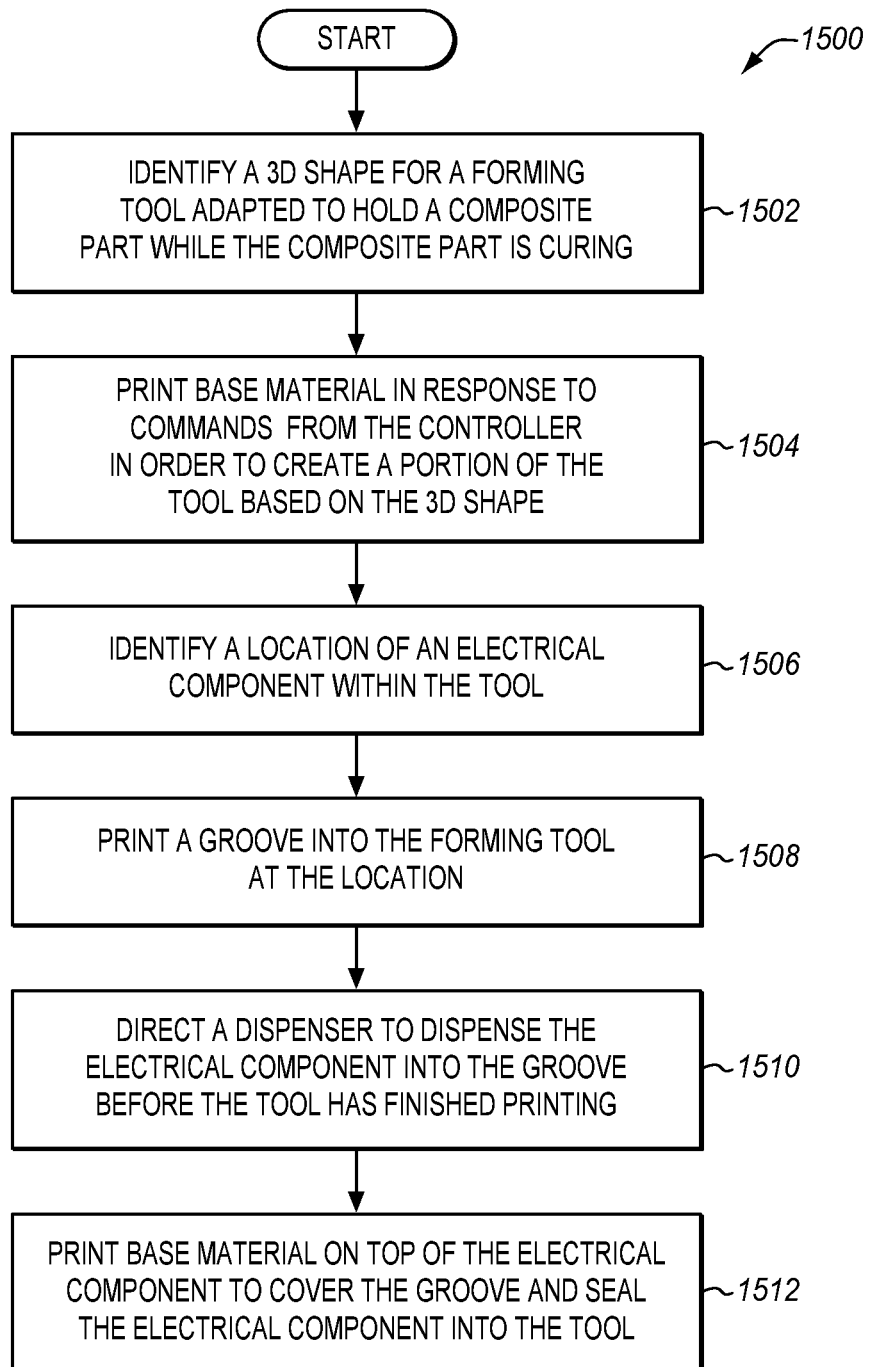
FIG. 15 is a flowchart illustrating a method of operating the system of FIG. 14 to print a forming tool in an exemplary embodiment.

FIG. 15 is a flowchart illustrating a method 1500 of operating the system of FIG. 14 to print a forming tool in an exemplary embodiment. The steps of FIG. 15 are illustrated at FIGS. 16-20, which show printing of an enhanced forming tool 1600 in an exemplary embodiment.

Figure 16:
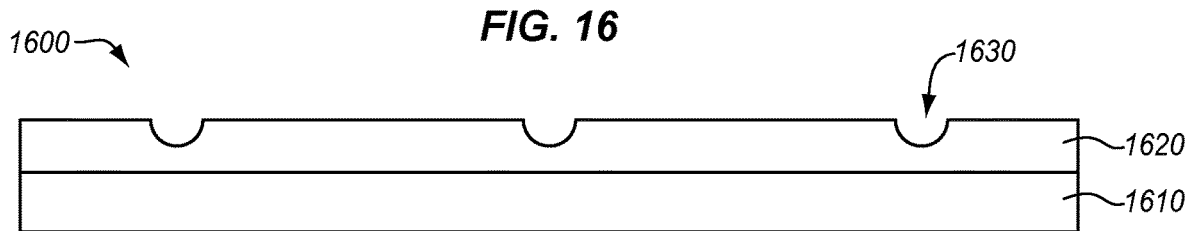
FIGS. 16-20 are diagrams illustrating printing of an enhanced forming tool in an exemplary embodiment.

In step 1502, controller 1410 identifies a three dimensional (3D) shape for forming tool 1600 of FIG. 16. This 3D shape need not be the shape of a mold/top surface of tool 1600, but comprises the entirety of tool 1600 itself. When printed with the 3D shape, forming tool 1600 will be configured to hold a composite part while the composite part is curing. A user may program the 3D shape into controller 1410 as a design that indicates how to print forming tool 1600. Alternatively, a user may indicate the shape of a mold to use for forming tool 1600, and then rely on controller 1410 to automatically design one or more thermocouples into forming tool 1600. When the design has been determined, 3D printer 1430 prints (e.g., adds incremental units of) base material in response to commands from controller 1410. This helps to create a portion of tool 1600 based on the 3D shape (step 1504). Part of this process may involve printing a base layer 1610, as well as an upper layer 1620.

During the printing of forming tool 1600, partway through the build of forming tool 1600, controller 1410 identifies a location 1630 to place an electrical component (e.g., a thermocouple or heating element) within the tool 1600 in step 1506. This location may be explicitly indicated in a design stored in memory, or the location may be selected by controller 1410 based on an indicated depth for the thermocouple within forming tool 1600, as well as a surfacing location for the thermocouple within forming tool 1600. After the location has been determined, controller 1410 directs printer 1430 to place grooves at location 1630 which the thermocouple will be placed (step 1508).

Figure 17:
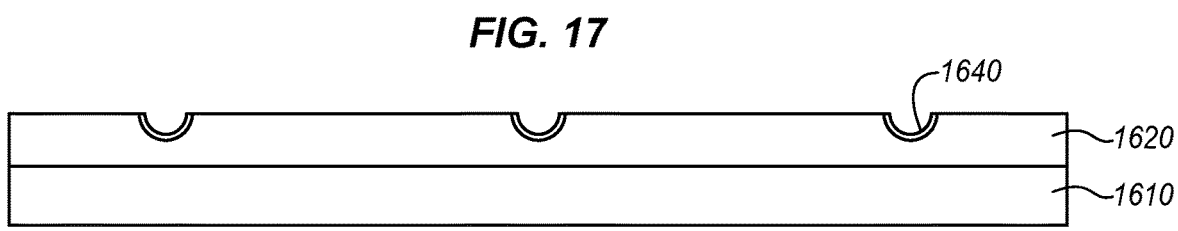
Figure 18:
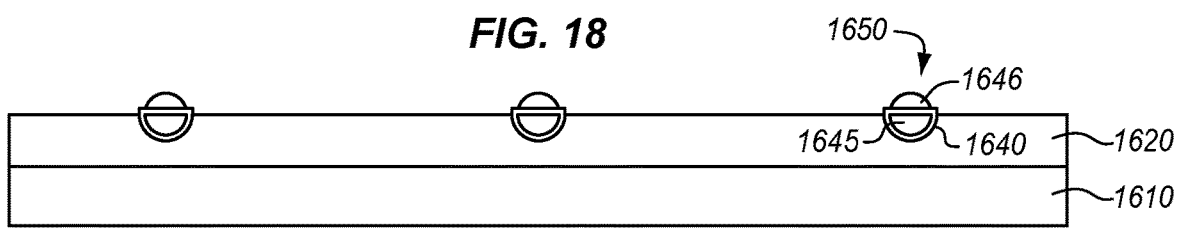
Figure 19:
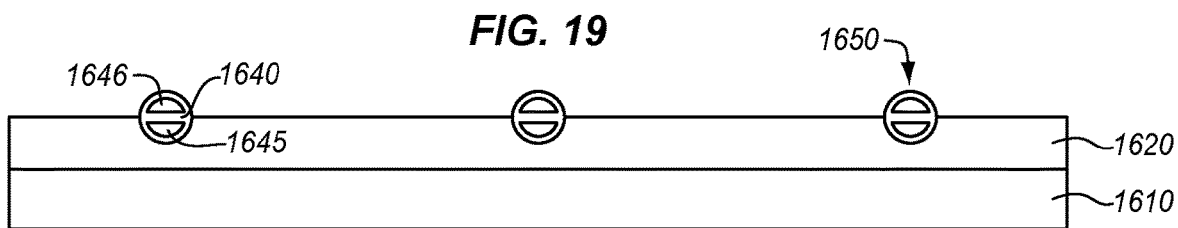
Figure 20:
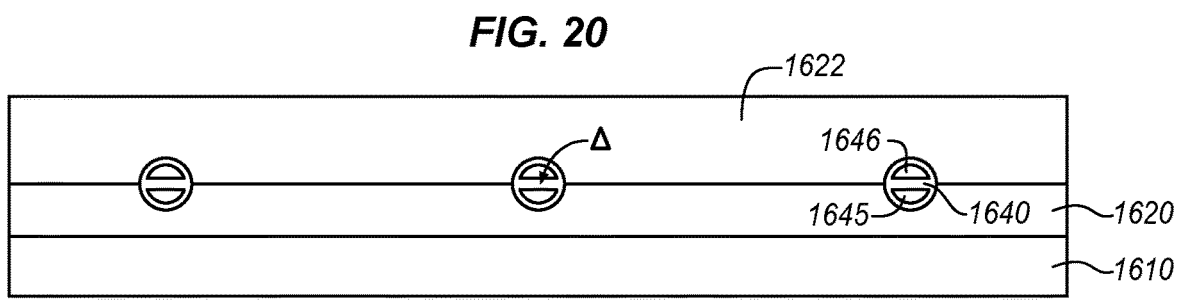

In step 1510, controller 1410 directs one of dispensers 1420 (e.g., a different nozzle of printer 1430, or an entirely separate device) to dispense material for the electrical component (e.g., thermocouple) into tool 1600 while tool 1600 is being printed (i.e., before tool 1600 has finished printing). This may comprise dispensing a first insulating jacket 1640 into each groove as shown in FIG. 17, dispensing a first material 1645 for thermocouple 1650, dispensing additional material for insulating jacket 1640, and dispensing a second material 1646 for thermocouple 1650, as shown in FIG. 18. The method may further include covering thermocouple 1650 in insulating jacket 1640, as shown in FIG. 19. In one embodiment, thermocouple 1650 is dispensed as a metal clay, and jacket 1640 is dispensed as a ceramic clay, resulting in a 3D printed structure within forming tool 1600. In such an embodiment, the clays should be sintered before thermocouple 1650 will be functional. Hence in step 1510, as shown in FIG. 20, controller 1410 directs printer 1430 to dispense additional base material 1622 (e.g., liquid metal) on top of thermocouple 1650 (or any suitable electrical component) to cover grooves and seal thermocouple 1650 into the tool. The metal, heated to melting or sintering point, bleeds heat into jacket 1640 and thermocouple 1650 (as indicated by the symbol $\Delta$), which causes both to sinter. Thus, by continuing the 3D printing process to produce the desired shape for forming tool 1600, controller 1410 also sinters thermocouple 1650 to render thermocouple 1650 functional. Similar techniques may be utilized to print thermocouple plugs and other features (e.g., integrated antennae for transmitting temperature data) directly into tool 1600. In this manner, these electric/electronic components extend beneath the surface of tool 1600 and are less subject to wear and tear.

Figure 21:
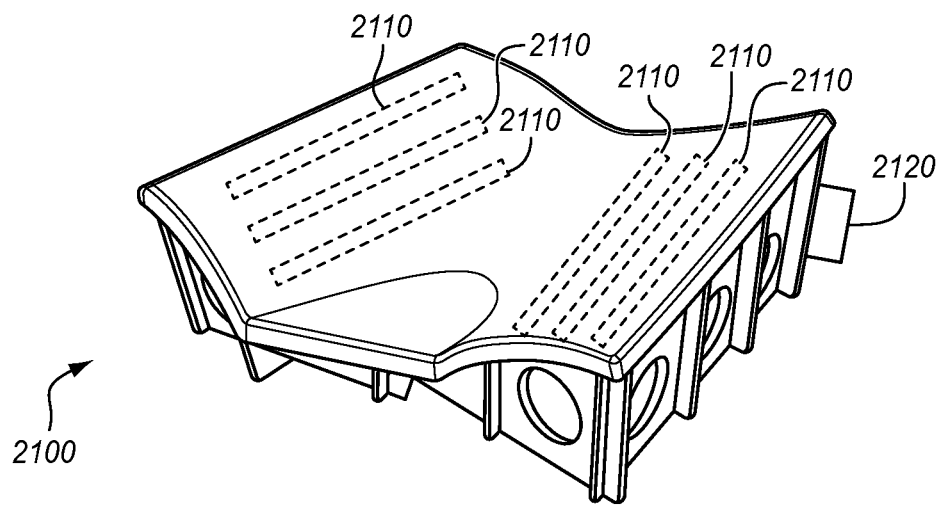
FIG. 21 is a diagram illustrating a forming tool enhanced with integrated heating elements and electronics in an exemplary embodiment.

FIG. 21 is a diagram illustrating a further forming tool 2100 enhanced with integrated heating elements 2110 and electronics in an exemplary embodiment. In FIG. 21, heating elements 2110 may comprise integrated, sub-surface susceptors or resistors within tool 2100. Heating elements 2110 may be utilized to facilitate even heating of a composite part within an autoclave, or may even be utilized as an alternative to autoclave curing of a composite part. Heating elements 2110 may be printed and/or assembled in a similar manner to the thermocouples (e.g., 1210) described above, in order to integrate heating elements 2110 into a forming tool. In this embodiment, junction box 2120 provides an electrical connection for heating elements 2110 to receive power.

Junction box 2120 may be implemented as a 3D printed circuit that exhibits no air cavities between its components, which may enhance the overall life expectancy of junction box 2120 across many cycles of autoclave heating.

Figure 22:
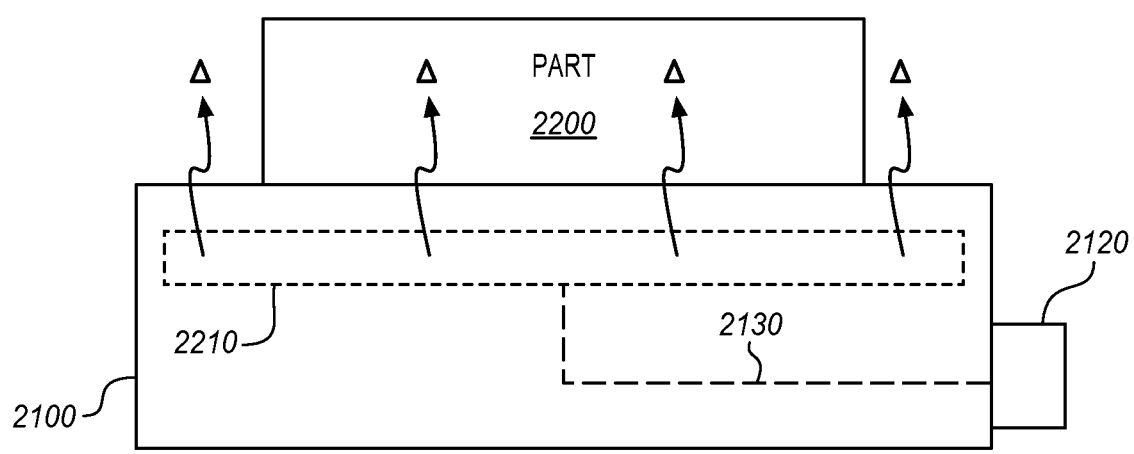
FIG. 22 is a diagram illustrating application of heat by a forming tool of FIG. 21 in an exemplary embodiment.

FIG. 22 is a diagram illustrating application of heat by a forming tool 2100 of FIG. 21 in an exemplary embodiment. In FIG. 22, power is supplied from junction box 2120 to resistive heating element 2210 via wire 2130. This causes resistive heating element 2210 to increase in temperature, which heats part 2200 as indicated by the symbol $\Delta$. In further embodiments, forming tools may be printed that include integrated heating elements and/or integrated thermocouples, in order to provide for enhanced temperature measurement and control for a composite part during the curing process. Heating elements 2210 may be integrated into forming tool 2100 in a similar manner as described above for thermocouples 1210 of FIG. 12.

In a further embodiment, heating elements 2210 may be selectively activated and deactivated in order to control the temperature various locations within a composite part. For example, in an embodiment where temperatures are measured at multiple locations on the composite part, a controller (e.g., controller 1230) may identify a location on the composite part corresponding to the detected temperature, and then select one or more heating elements 2210 within tool 2100 that are proximate to the identified location. The controller may then adjust the amount of heat generated by the selected heating element(s).

Figure 23:
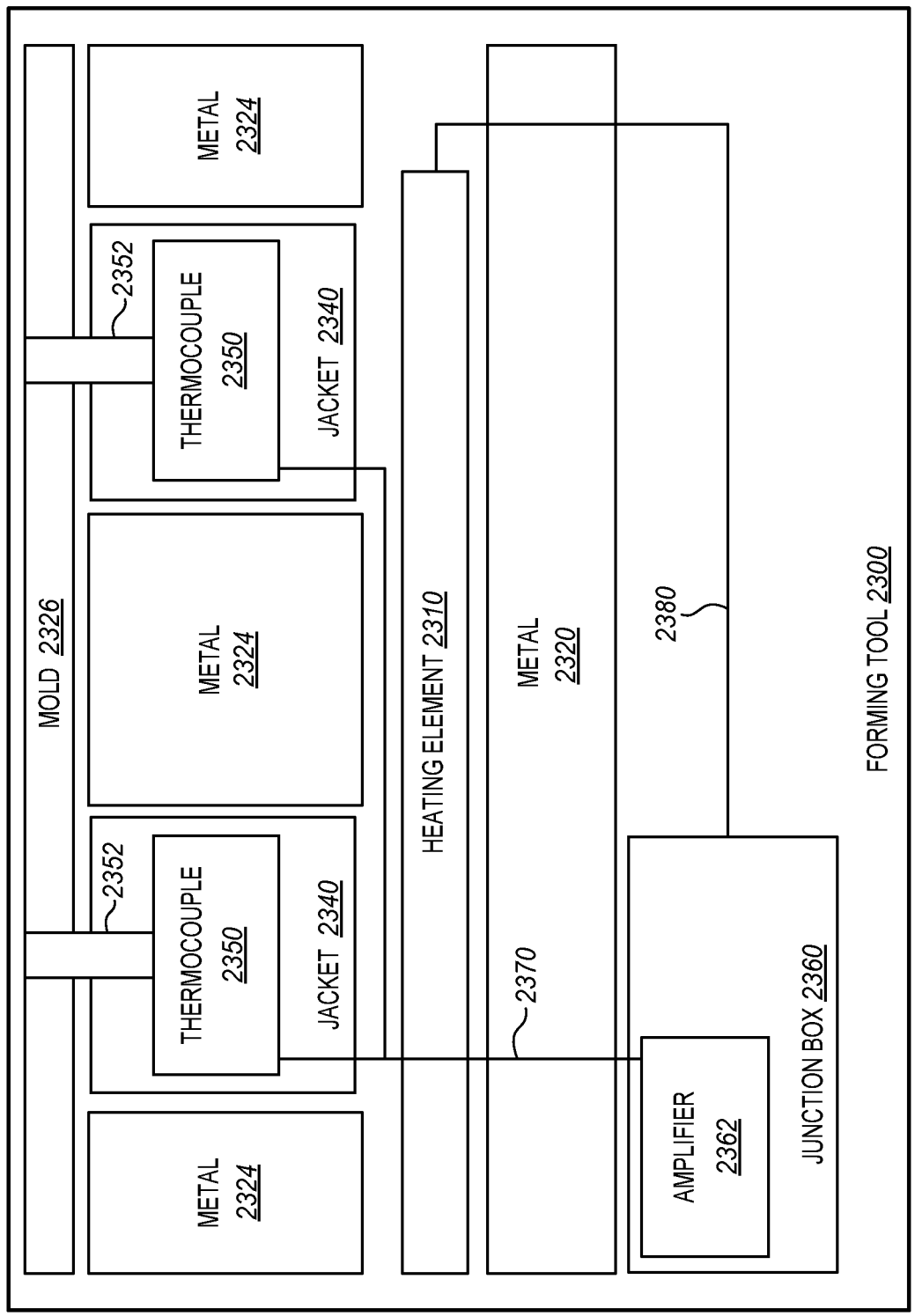
FIG. 23 is a block diagram illustrating an enhanced forming tool in an exemplary embodiment.

FIG. 23 is a block diagram illustrating an enhanced forming tool 2300 in an exemplary embodiment. In this embodiment forming tool 2300 includes a base layer of metal 2320, to which junction box 2360 is attached. Junction box 2360 includes amplifier 2362 for amplifying incoming signaling from thermocouples 2350, received via wires/traces 2370. Junction box 2360 also provides power via wires/traces 2380 to one or more heating elements 2310. Heating elements 2310 are sub-surface heating elements placed above metal 2320. Jackets 2340 insulate thermocouples 2350 proximate to metal 2324, and thermocouples 2350 include a portion 2352 that protrudes into the surface of mold 2326, ensuring that accurate temperature measurements may be acquired for a composite part being cured on forming tool 2300.

Recycling of Forming Tools 3D printing techniques may be used to recycle forming tools whenever designs for composite parts are changed. These techniques may also be used to restore forming tools as they degrade over time. Additive manufacturing processes, such as 3D printing of metal as described above, may be utilized in order to reshape an existing forming tool into a new one.

Figure 24:
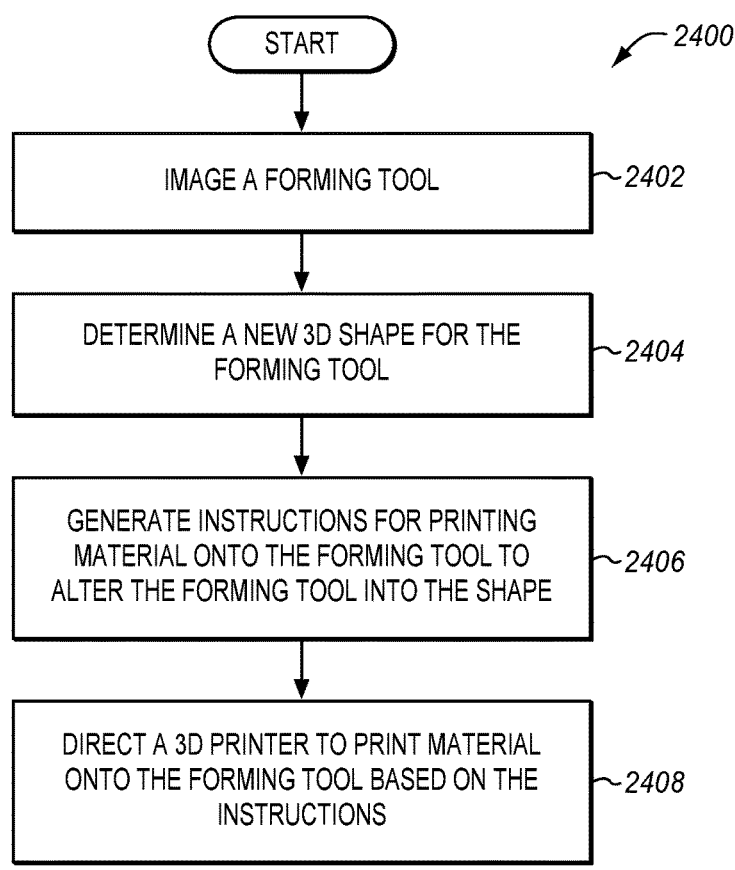
FIG. 24 is a flowchart illustrating a method for utilizing additive manufacturing to modify an existing forming tool in an exemplary embodiment.
Figure 25:
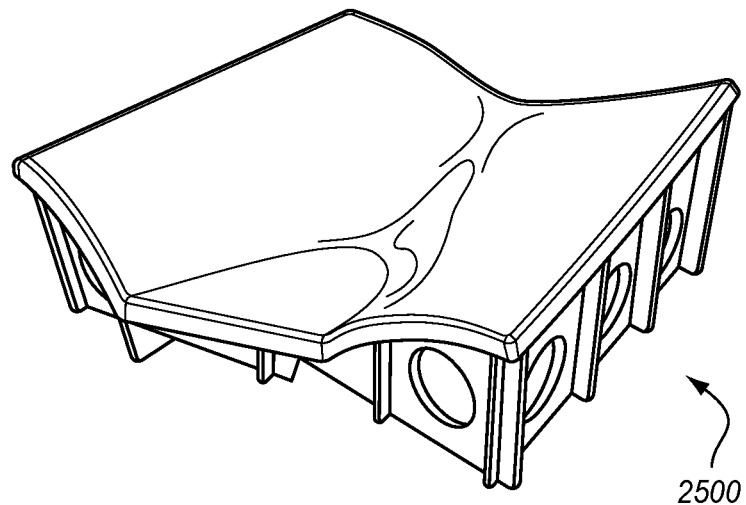
FIG. 25 is a diagram illustrating a forming tool before it is modified according to the method of FIG. 24.
Figure 26:
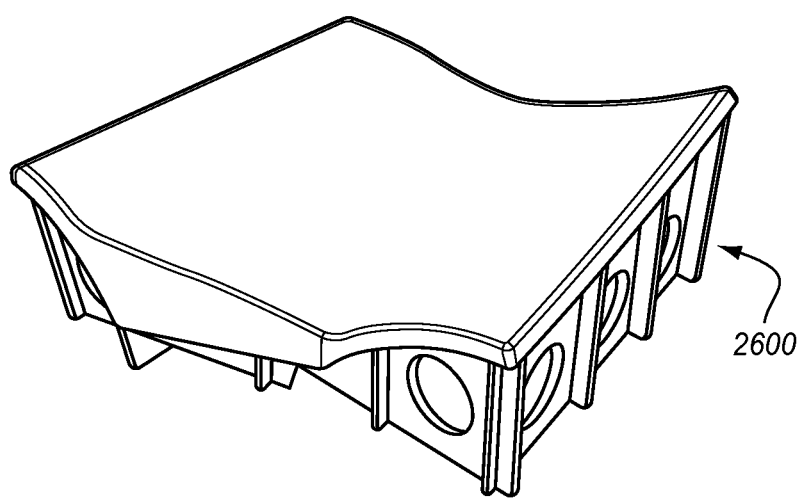
FIG. 26 is a diagram illustrating a forming tool after it is modified according to the method of FIG. 24.

FIG. 24 is a flowchart illustrating a method 2400 for utilizing additive manufacturing to modify an existing forming tool in an exemplary embodiment. In this embodiment, forming tool 2500 of FIG. 25 has been selected for retooling. This may occur because forming tool 2500 has warped/degraded over time, or because forming tool 2500 is no longer needed for manufacturing the composite part it was previously used for.

According to method 2400, in step 2402, controller 1410 operates imaging system 1440 to analyze forming tool 2500. Controller 1410 also determines a new 3D shape for forming tool 2500. The new 3D shape includes features which are not currently a part of forming tool 2500, but which may be created at forming tool 2500 as part of an additive manufacturing process. To this end, controller 1410 generates instructions in step 2406 for printing heat-resistant material onto forming tool 2500 in order to alter the shape of forming tool 2500. Step 2408 comprises directing 3D printer 1430 to print material onto forming tool 2500, based on the generated instructions. This changes forming tool 2500 into forming tool 2600 of FIG. 26. Forming tool 2600 may be utilized, for example, to facilitate the manufacturing of a different composite part.

Enhancements to Carts Utilized for Autoclave Curing of Vacuum Bagged Composite Parts The carts discussed herein may also be enhanced with features to facilitate the curing of a composite part. Specifically, the carts discussed herein may provide an electrical connection to the enhanced tools discussed above.

FIG. 27 is a diagram illustrating an enhanced cart 2750 with an electrical connector 2756 adapted to mate with a power system 2716 of an autoclave 2700 in an exemplary embodiment. According to this embodiment, cart 2750 is mounted onto rail 2710 of autoclave 2700. Cart 2750 may therefore move back and forth along rail 2710. In preparation for curing of a part, feet/wheels 2758 of cart 2750 are placed into foot pads 2712 of autoclave 2700 and locked in place. Outlet 2714 and connector 2756 are dimensioned to mate with each other and form an electrical connection when cart 2750 is locked into place. In this manner, power may be supplied from power system 2716, through power system 2754 of cart 2750, into outlet 2752 of cart 2750, through junction box 2820 of tool 2800, through electrical lines 2830 of tool 2800, and into heating elements 2810. Similar wiring techniques may be utilized to acquire signaling from thermocouples mounted in tool 2800. This technique provides a benefit over prior systems, because it does not expose "naked" wiring to the interior of autoclave 2700, decreasing labor costs, eliminating trip hazards, and reducing thermocouple plug match recording errors. FIG. 28 is a diagram illustrating an enhanced cart 2750 with an electrical connector 2756 that is mated with an outlet 2714 of autoclave 2700. Cart 2750 has been mounted in place for curing, cause connector 2765 to form an electrical connection with power system 2716. Connector 2765 may additionally or alternatively include signaling wires, thermocouple wires, etc. pertaining to cart 2750, tool 2600, and/or other components for mating with corresponding electrical components of autoclave 2700.

FIG. 29 is a block diagram illustrating an enhanced cart within an autoclave in an exemplary embodiment. As shown in FIG. 29, autoclave 2900 includes a heater 2902 which is configured to heat the interior of autoclave 2900. Autoclave 2900 further includes rail 2910, which includes foot pads 2912, outlet 2914, and power system 2916. Cart 2950 includes multiple legs 2953. Each leg 2953 includes a foot 2958, and one of legs 2953 includes connector 2956, which is configured to align with outlet 2914 when feet 2958 are placed in foot pads 2912. Power system 2954 couples connector 2956 to outlet 2952, which is found within body 2959 of cart 2950.

EXAMPLES

Figure 30:
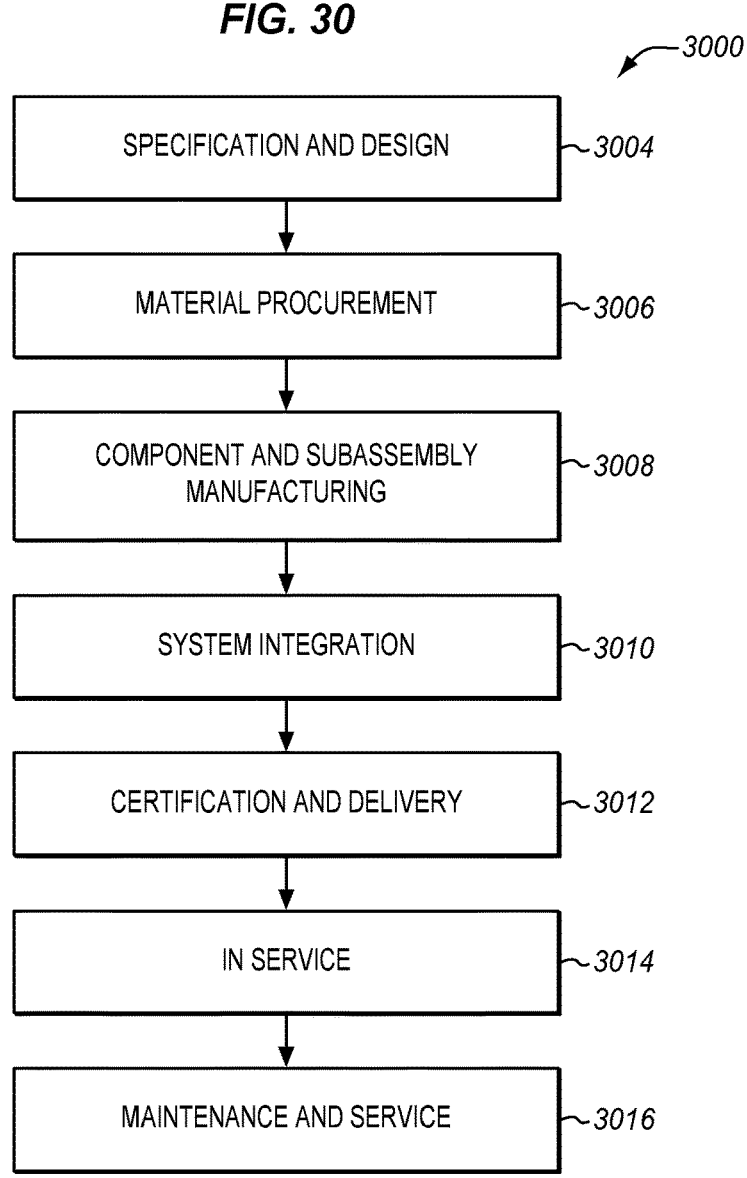
FIG. 30 is a flow diagram of aircraft production and service methodology in an exemplary embodiment.
Figure 31:
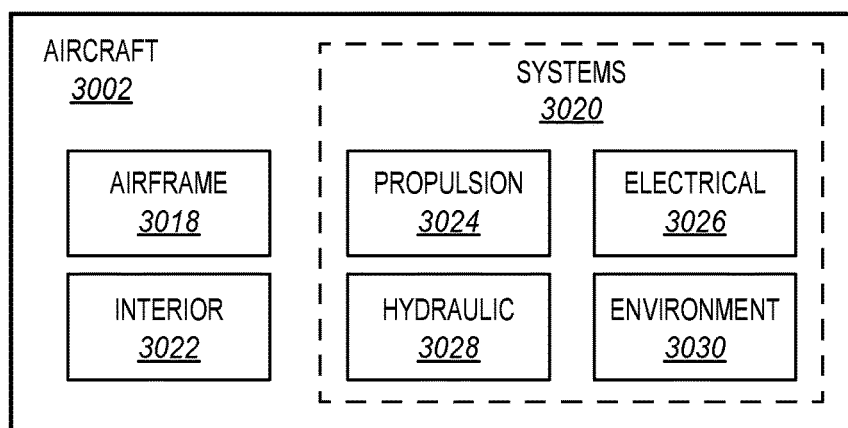
FIG. 31 is a block diagram of an aircraft in an exemplary embodiment.

Referring more particularly to the drawings, embodiments of the disclosure may be described in the context of an aircraft manufacturing and service method 3000 as shown in FIG. 30 and an aircraft 3002 as shown in FIG. 31. During pre-production, exemplary method 3000 may include specification and design 3004 of the aircraft 3002 and material procurement 3006. During production, component and subassembly manufacturing 3008 and system integration 3010 of the aircraft 3002 takes place. Thereafter, the aircraft 3002 may go through certification and delivery 3012 in order to be placed in service 3014. While in service by a customer, the aircraft 3002 is scheduled for routine maintenance and service 3016 (which may also include modification, reconfiguration, refurbishment, and so on).

Each of the processes of method 3000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 3002 produced by exemplary method 3000 may include an airframe 3018 with a plurality of systems 3020 and an interior 3022. Examples of high-level systems 3020 include one or more of a propulsion system 3024, an electrical system 3026, a hydraulic system 3026, and an environmental system 3030. Any number of other systems may be included. Although an aerospace example is shown, the principles of the invention may be applied to other industries, such as the automotive industry.

Apparatus and methods embodied herein may be employed during any one or more of the stages of the production and service method 3000. For example, components or subassemblies corresponding to production stage 3008 may be fabricated or manufactured in a manner similar to components or subassemblies produced while the aircraft 3002 is in service. Also, one or more apparatus embodiments, method embodiments, or a combination thereof may be utilized during the production stages 3008 and 3010, for example, by substantially expediting assembly of or reducing the cost of an aircraft 3002. Similarly, one or more of apparatus embodiments, method embodiments, or a combination thereof may be utilized while the aircraft 3002 is in service, for example and without limitation, to maintenance and service 3016. For example, the techniques and systems described herein may be used for steps 3006, 3008, 2010, 3014, and 3016, and may be used for airframe 3018 and/or interior 3022.

Specifically, the automated placement of consumables for vacuum bagging described herein may be utilized in production stage 3008 in order to facility component and subassembly manufacturing processes for composite parts. Enhanced forming tools and carts may also be utilized in a similar manner. The retooling of forming tools discussed herein may be performed, for example, as part of maintenance and service 3016 for those forming tools.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method for fabricating a composite part, the method comprising:
   identifying a location for placing the composite part on a forming tool;
   applying a sealant in the form of an adhesive chemical onto the tool that surrounds the location without intersecting the location;
   laying up a laminate of constituent material for the composite part at the location;
   spraying vacuum bag material atop the laminate and spraying vacuum bag material directly onto the sealant;
   changing solidification of the vacuum bag material by varying an exposure of the vacuum bag material to reacting gases in surroundings; and
   waiting for the vacuum bag material to solidify to form a vacuum bag that covers the laminate.

2. The method of claim 1 wherein:
   changing solidification comprises altering a parts per million of a gas that reacts with the vacuum bag material, in order to increase solidification the vacuum bag material to react and solidify.

3. The method of claim 1 wherein:
   the forming tool, the laminate, and the vacuum bag material are within an interior that is sealed from an external environment.

4. The method of claim 1 wherein:
   the vacuum bag material includes a tracer dye, and the method further comprises:
   determining an amount of tracer dye at a position covering the part; and
   selectively spraying more vacuum bag material at the position based on the amount of tracer dye.

5. The method of claim 4 wherein:
   determining the amount of the tracer dye at the position is based on a color of the position.

6. The method of claim 1 further comprising:
   identifying a port that has been placed atop the laminate; and
   spraying the vacuum bag material to surround the port without blocking airflow through the port.

7. The method of claim 1 further comprising:
   applying a pressure pad material by printing liquid polymer atop the laminate at selected locations; and
   waiting for the liquid polymer to solidify before spraying the vacuum bag material.

8. A method for fabricating a composite part, the method comprising:
   identifying a location for placing the composite part on a forming tool;
   applying a sealant in the form of a liquid adhesive chemical onto the tool that surrounds the location without intersecting the location;
   applying a mold release agent in the form of an aerosol spray at the location for placing the composite part on the forming tool;
   laying up a laminate of constituent material for the composite part at the location;
   spraying vacuum bag material atop the laminate and spraying vacuum bag material directly onto the sealant;

changing solidification of the vacuum bag material by varying an exposure of the vacuum bag material to reacting gases in surroundings; and waiting for the vacuum bag material to solidify to form a vacuum bag that covers the laminate.

9. The method of claim 8 further comprising:

laying up the laminate directly onto the mold release agent.

10. The method of claim 8 further comprising:

applying a breather material atop the laminate.

11. The method of claim 8 wherein:

the mold release agent facilitates removal of the composite part from the forming tool after the composite part is cured.

12. The method of claim 8 wherein:

the mold release agent is applied as an aerosol spray.

13. The method of claim 8 further comprising:

applying a pressure pad material by printing liquid polymer atop the laminate at selected locations; and waiting for the liquid polymer to solidify before spraying the vacuum bag material.

14. The method of claim 8 further comprising:

waiting for the vacuum bag material to solidify into an impermeable solid.

15. The method of claim 8 further comprising:

identifying a port that has been placed atop the laminate; and spraying the vacuum bag material to surround the port without blocking airflow through the port.

16. The method of claim 8 wherein:

the vacuum bag material includes a tracer dye, and the method further comprises:

determining an amount of tracer dye at a position covering the part; and selectively spraying more vacuum bag material at the position based on the amount of tracer dye.

17. The method of claim 16 wherein:

determining the amount of the tracer dye at the position is based on a color of the position.

18. A method for fabricating a composite part, the method comprising:

identifying a location for placing the composite part on a forming tool;

applying a sealant in the form of a liquid adhesive chemical onto the tool that surrounds the location without intersecting the location;

laying up a laminate of constituent material for the composite part at the location;

spraying vacuum bag material atop the laminate and spraying vacuum bag material directly onto the sealant;

changing solidification of the vacuum bag material by varying an exposure of the vacuum bag material to reacting gases in surroundings wherein the reacting gases comprise oxygen; and waiting for the vacuum bag material to solidify to form a vacuum bag that covers the laminate.

19. The method of claim 18 wherein:

the vacuum bag material includes a tracer dye, and the method further comprises: determining an amount of tracer dye at a position covering the part; and selectively spraying more vacuum bag material at the position based on the amount of tracer dye.

20. The method of claim 18 wherein:

the vacuum bag material comprises polyethylene latex.

* * * * *